United States Patent
Husain et al.

(10) Patent No.: US 9,983,581 B1
(45) Date of Patent: May 29, 2018

(54) ARTIFICIAL INTELLIGENCE AUGMENTED REALITY COMMAND, CONTROL AND COMMUNICATIONS SYSTEM

(71) Applicant: SparkCognition, Inc., Austin, TX (US)

(72) Inventors: Syed Mohammad Amir Husain, Georgetown, TX (US); John Rutherford Allen, Alexandria, VA (US)

(73) Assignee: SPARKCOGNITION, INC., Austin, TX (US)

( * ) Notice: Subject to any disclaimer, the term of this patent is extended or adjusted under 35 U.S.C. 154(b) by 0 days. days.

(21) Appl. No.: 15/705,027

(22) Filed: Sep. 14, 2017

(51) Int. Cl.
  *G05D 1/00* (2006.01)
  *B64C 39/02* (2006.01)
  *H04N 7/18* (2006.01)

(52) U.S. Cl.
  CPC ......... *G05D 1/0038* (2013.01); *G05D 1/0027* (2013.01); *G05D 1/0088* (2013.01); *B64C 39/024* (2013.01); *B64C 2201/042* (2013.01); *B64C 2201/121* (2013.01); *B64C 2201/141* (2013.01); *B64C 2201/146* (2013.01); *H04N 7/18* (2013.01)

(58) Field of Classification Search
  CPC .. G05D 1/0038; G05D 1/0088; G05D 1/0027; B64C 39/024; B64C 2201/121; B64C 2201/141; B64C 2201/146; B64C 2201/042; H04N 7/18
  USPC ....................................................... 701/1, 27
  See application file for complete search history.

(56) References Cited

U.S. PATENT DOCUMENTS

| | | | |
|---|---|---|---|
| 5,076,192 A | 12/1991 | Tegel et al. | |
| 5,675,116 A | 10/1997 | Hillenbrand | |
| 5,995,882 A * | 11/1999 | Patterson ................ | B63C 11/42 114/312 |
| 6,118,066 A | 9/2000 | Sirmalis et al. | |
| 6,376,762 B1 | 4/2002 | French et al. | |
| 7,290,496 B2 * | 11/2007 | Asfar ..................... | B63C 11/42 114/312 |
| 7,556,219 B2 | 7/2009 | Page et al. | |
| 8,091,461 B1 | 1/2012 | Buescher et al. | |
| 8,899,903 B1 | 12/2014 | Saad et al. | |
| 9,211,959 B2 | 12/2015 | Teller et al. | |
| 9,387,928 B1 | 7/2016 | Gentry et al. | |

(Continued)

*Primary Examiner* — Jaime Figueroa
(74) *Attorney, Agent, or Firm* — Toler Law Group, PC

(57) ABSTRACT

A method and system comprises a plurality of electronically controlled distributed devices and a supervisory node. The supervisory node comprises a communications interface, a processor, and a display. The supervisory node is configured to communicate with the plurality of electronically controlled distributed devices via the communications interface. The supervisory node is adapted to receive sensor information, to receive functionality information and device status information, to determine useful life prognostics from the functionality information, to obtain human defined policy and strategy directives, to assess the useful life prognostics and device status information based on the human defined policy and strategy directives to provide device assessments, to construct device commands for the plurality of electronically controlled distributed devices based on the device assessments using the processor, and to communicate the device commands to the plurality of electronically controlled distributed via the communications interface.

20 Claims, 16 Drawing Sheets

(56) References Cited

U.S. PATENT DOCUMENTS

| | | | |
|---|---|---|---|
| 9,611,017 B2* | 4/2017 | Jeng | B63G 5/00 |
| 9,623,760 B2 | 4/2017 | Wang et al. | |
| 9,828,094 B2 | 11/2017 | McMillion et al. | |
| 2003/0152892 A1 | 8/2003 | Huang et al. | |
| 2008/0041294 A1* | 2/2008 | Diorio | B63B 3/08 |
| | | | 114/312 |
| 2011/0266086 A1* | 11/2011 | Welker | B63B 27/36 |
| | | | 181/122 |
| 2013/0081245 A1 | 4/2013 | Vavrina et al. | |
| 2013/0199792 A1* | 8/2013 | Backes | E21B 43/0122 |
| | | | 166/335 |
| 2015/0298786 A1* | 10/2015 | Stigler | B64B 1/10 |
| | | | 244/30 |
| 2016/0039541 A1 | 2/2016 | Beardsley et al. | |
| 2016/0244135 A1* | 8/2016 | Farber | B63G 8/001 |
| 2017/0285203 A1* | 10/2017 | Fyffe | G01V 1/3852 |
| 2017/0350558 A1* | 12/2017 | Heinen | F17C 9/04 |

\* cited by examiner

ARTIFICIAL INTELLIGENCE AUGMENTED REALITY COMMAND, CONTROL AND COMMUNICATIONS SYSTEM

CROSS-REFERENCE TO RELATED APPLICATION(S)

The present application is related to co-pending U.S. application entitled "AUTONOMOUS VESSEL FOR UNMANNED COMBAT AERIAL VEHICLE (UCAV) CARRIER OPERATIONS" Ser. No. 15/048,855; co-pending U.S. patent application entitled "STACKABLE UNMANNED AERIAL VEHICLE (UAV) SYSTEM AND PORTABLE HANGAR SYSTEM THEREFOR" Ser. No. 15/704,908; co-pending U.S. patent application entitled "ANTI-AIRCRAFT AUTONOMOUS UNDERSEA SYSTEM (AUS) WITH MACHINE VISION TARGET ACQUISITION" Ser. No. 15/704,949; and co-pending U.S. patent application entitled "AERIALLY DISPERSIBLE MASSIVELY DISTRIBUTED SENSORLET SYSTEM" Ser. No. 15/704,991; the entirety of which are herein incorporated by reference.

BACKGROUND

Field of the Disclosure

The present disclosure relates generally to a command and control system for distributed system elements and more particularly to a command and control system responsive to automatically generated control information and human-generated control information.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

A method and system comprising a plurality of electronically controlled distributed self-propelled devices and a supervisory node is disclosed. The supervisory node comprises a communications interface, a processor coupled to the communications interface, and a display coupled to the processor. The supervisory node is configured to communicate with the plurality of electronically controlled distributed self-propelled devices via the communications interface. The supervisory node is adapted to receive sensor information from the plurality of electronically controlled distributed self-propelled devices, to receive functionality information and device status information from the plurality of electronically controlled distributed self-propelled devices, to determine useful life prognostics from the functionality information using the processor, to obtain human defined policy and strategy directives, to assess the useful life prognostics and device status information based on the human defined policy and strategy directives using the processor to provide device assessments, to construct device commands for the plurality of electronically controlled distributed self-propelled devices based on the device assessments using the processor, and to communicate the device commands to the plurality of electronically controlled distributed self-propelled devices via the communications interface. In accordance with at least one embodiment, the devices may be a plurality of electronically controlled distributed devices that are not self-propelled. As examples, the devices can be devices of an electrical system, such as an electric power system or a solid state electrical system.

Figure 1:
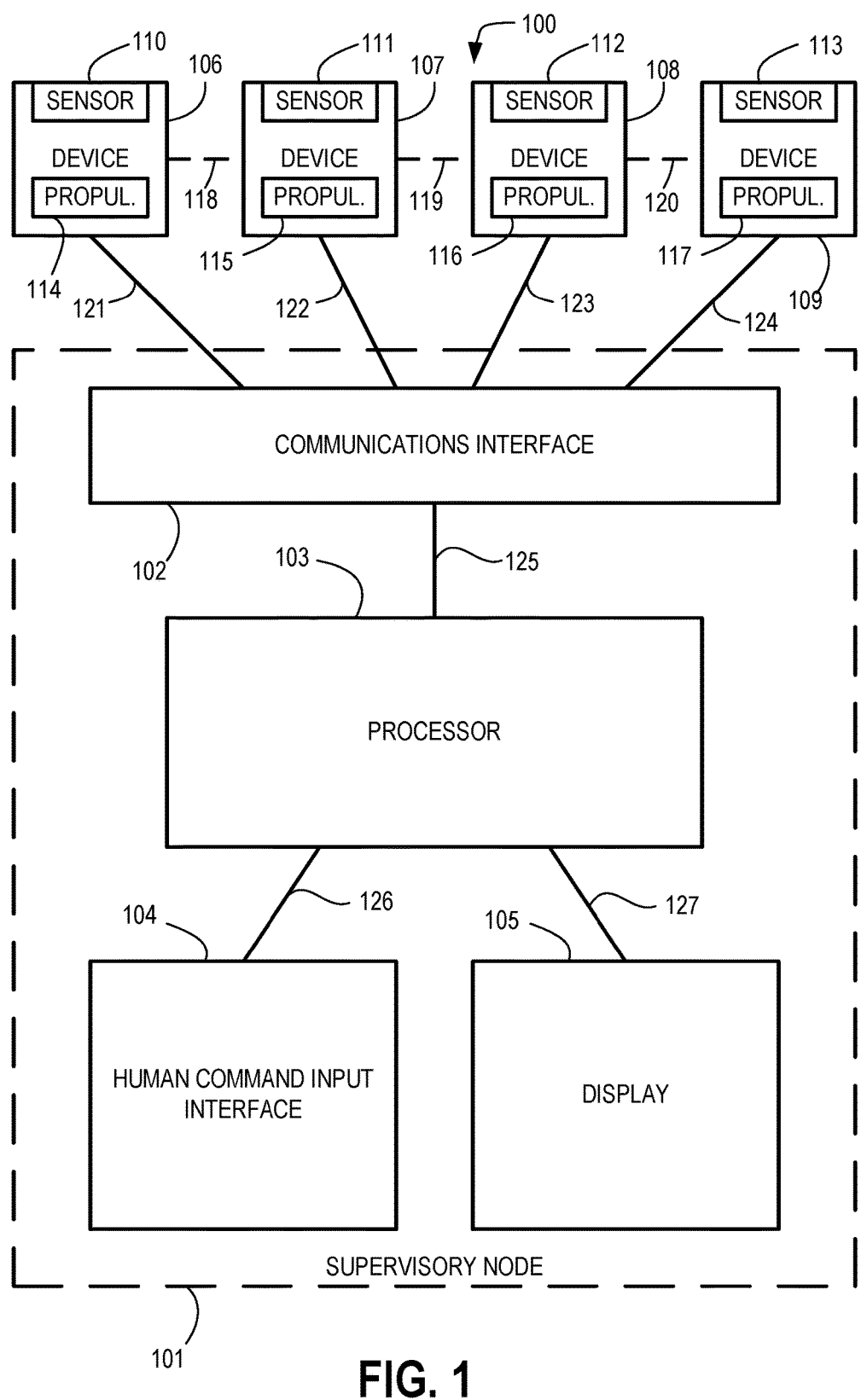
FIG. 1 is a block diagram illustrating a command and control system in accordance with at least one embodiment.

FIG. 1 is a block diagram illustrating a command and control system in accordance with at least one embodiment. System 100 comprises a supervisory node 101 and a plurality of electronically controlled distributed self-propelled devices 106, 107, 108, and 109. Supervisory node 101 comprises a communications interface 102, a processor 103, a human command input interface 104, and a display 105. Communications interface 102 is connected to processor 103 via interconnect 125. Human command input interface 104 is connected to processor 103 via interconnect 126. Processor 103 is connected to display 105 via interconnect 127.

Electronically controlled self-propelled device 106 is in communication with supervisory node 101, specifically with communications interface 102, via communications link 121. Electronically controlled self-propelled device 107 is in communication with supervisory node 101, specifically with communications interface 102, via communications link 122. Electronically controlled self-propelled device 108 is in communication with supervisory node 101, specifically with communications interface 102, via communications link 123. Electronically controlled self-propelled device 109 is in communication with supervisory node 101, specifically with communications interface 102, via communications link 124.

Electronically controlled self-propelled device 106 comprises sensor 110 and propulsion motor 114. Electronically controlled self-propelled device 107 comprises sensor 111 and propulsion motor 115. Electronically controlled self-propelled device 108 comprises sensor 112 and propulsion motor 116. Electronically controlled self-propelled device 109 comprises sensor 113 and propulsion motor 117.

Figure 2:
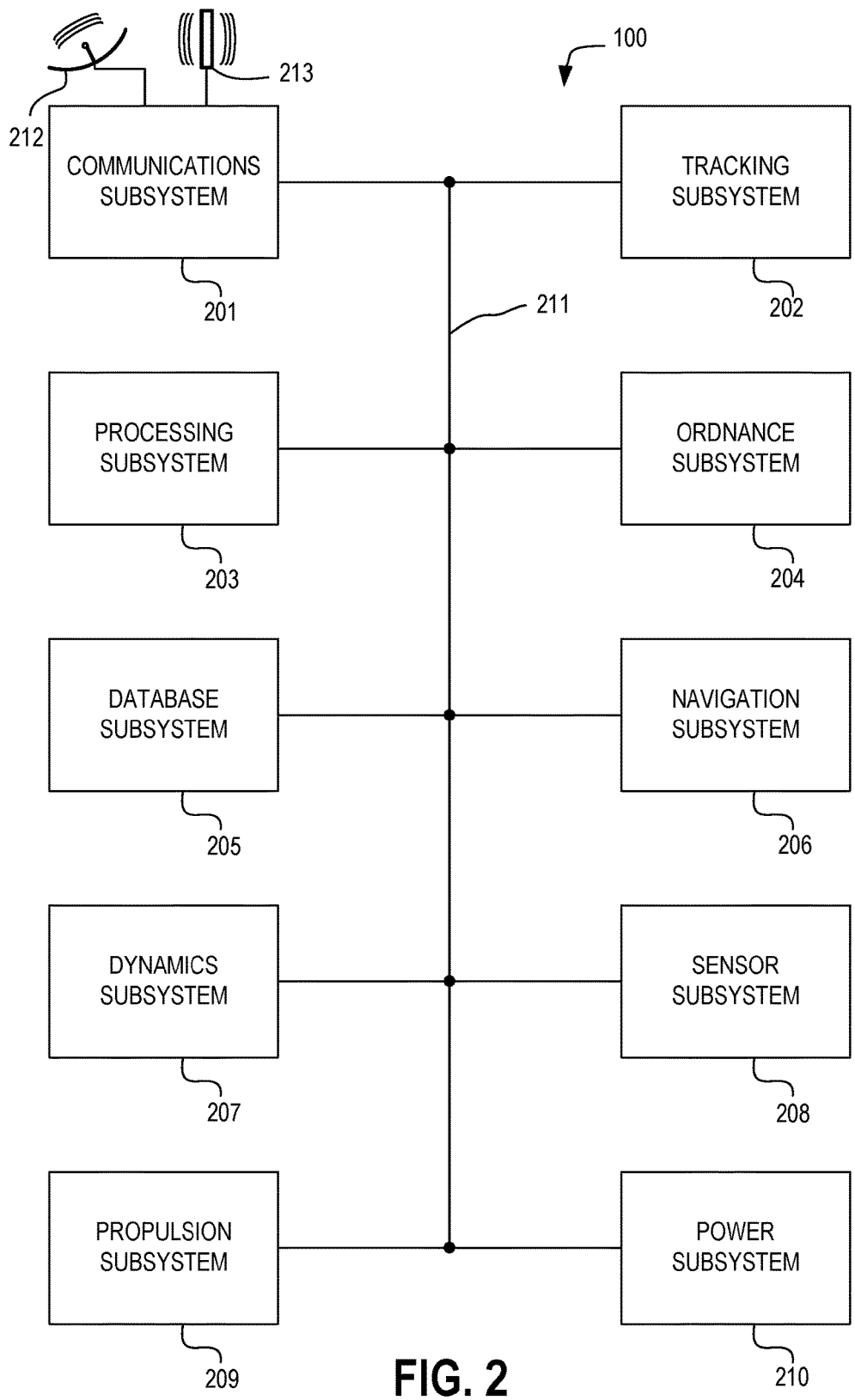
FIG. 2 is a block diagram illustrating an electronically controlled self-propelled device as may be used in a system in accordance with at least one embodiment.

FIG. 2 is a block diagram illustrating an electronically controlled self-propelled device as may be used in a system in accordance with at least one embodiment. The electronically controlled self-propelled device comprises communications subsystem 201, tracking subsystem 202, processing subsystem 203, ordnance subsystem 204, database subsystem 205, navigation subsystem 206, dynamics subsystem 207, sensor subsystem 208, propulsion subsystem 209, and power subsystem 210. Each of such subsystems is coupled to at least another of such subsystems. In the illustrated example, the subsystems are coupled to each other via interconnect 211. Communications subsystem 201 may be coupled to antennas, such as satellite antenna 212 and terrestrial antenna 213. Other embodiments may be implemented with a subset of the above subsystems or with additional subsystems beyond the above subsystems or a subset thereof.

The elements shown in FIG. 2 may, for example, be distributed among components of the electronically controlled self-propelled device. As an example, one or more elements shown in FIG. 2 may be incorporated in one or more electronically controlled self-propelled devices, while another one or more elements may be incorporated in a hangar structure from which electronically controlled self-propelled devices may be deployed or in a host platform to which the hangar structure may be mounted. As another example, multiple instances of one or more elements shown in FIG. 2 may be provided, with one or more instances incorporated in one or more electronically controlled self-propelled devices and another one or more instances incorporated in a hangar structure or host platform. As may be desired, one or more elements shown in FIG. 2 may be omitted from the electronically controlled self-propelled device, according to at least one embodiment.

Figure 3:
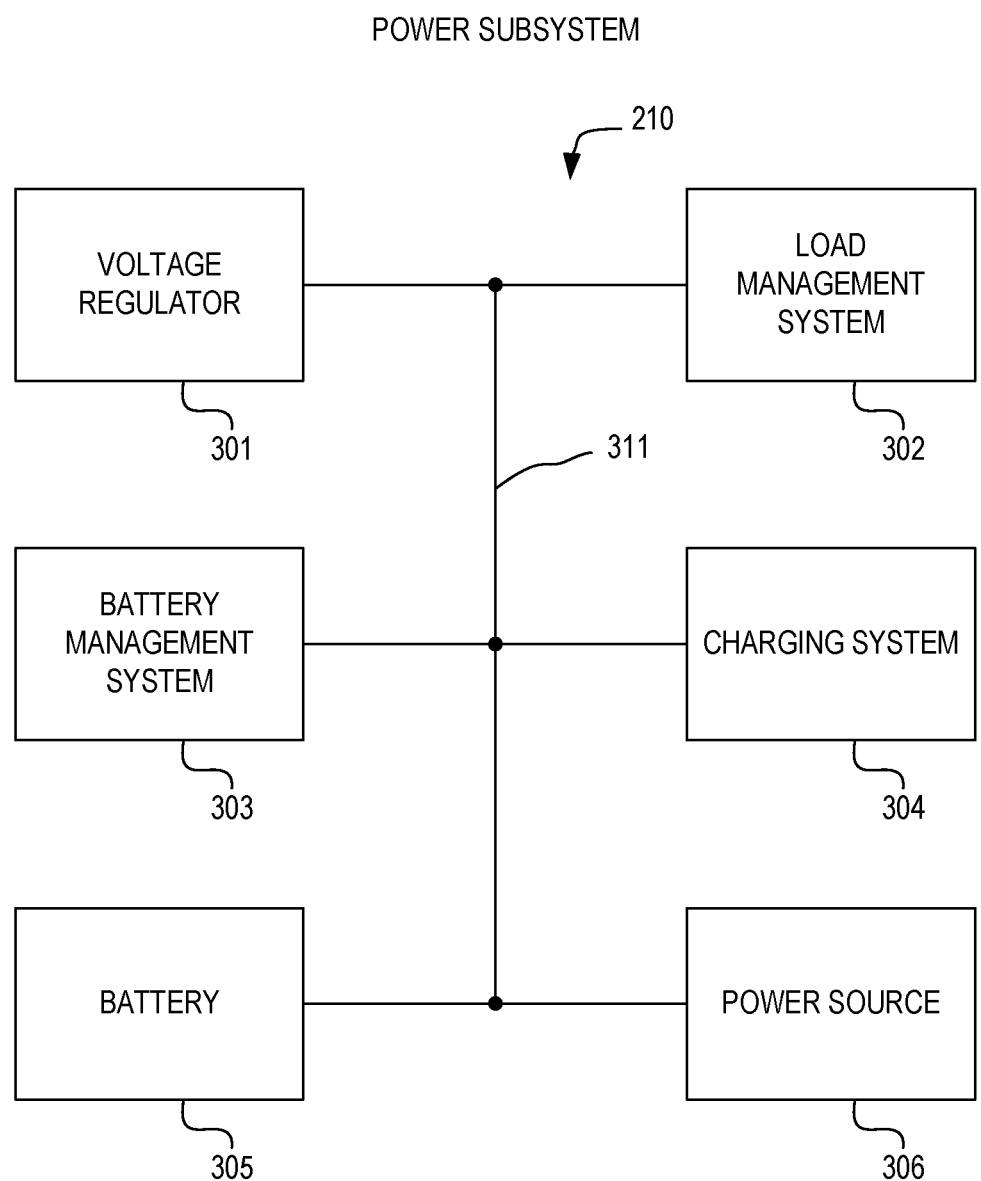
FIG. 3 is a block diagram illustrating a power subsystem of an electronically controlled self-propelled device as may be used in a system in accordance with at least one embodiment.

FIG. 3 is a block diagram illustrating a power subsystem of an electronically controlled self-propelled device as may be used in a system in accordance with at least one embodiment. Power subsystem 210 comprises voltage regulator 301, load management system 302, battery management system 303, charging system 304, battery 305, and power source 306. Each of such elements is coupled to at least another of such elements. In the illustrated example, the elements are coupled to each other via interconnect 311.

As examples, power source 306 can be a solar power source, a wind power source, a wave power source, a hydrothermal power source, a chemical fuel power source, a nuclear power source, or another type of power source. Charging system 304 can be configured to charge battery 305 using power obtained from power source 306. Battery management system can manage a battery state of battery 305 and can monitor charging and discharging of battery 305. Load management system 302 can monitor power used by loads, such as other subsystems shown in FIG. 2. Voltage regulator 301 can provide one or more regulated voltages to the loads.

Figure 4:
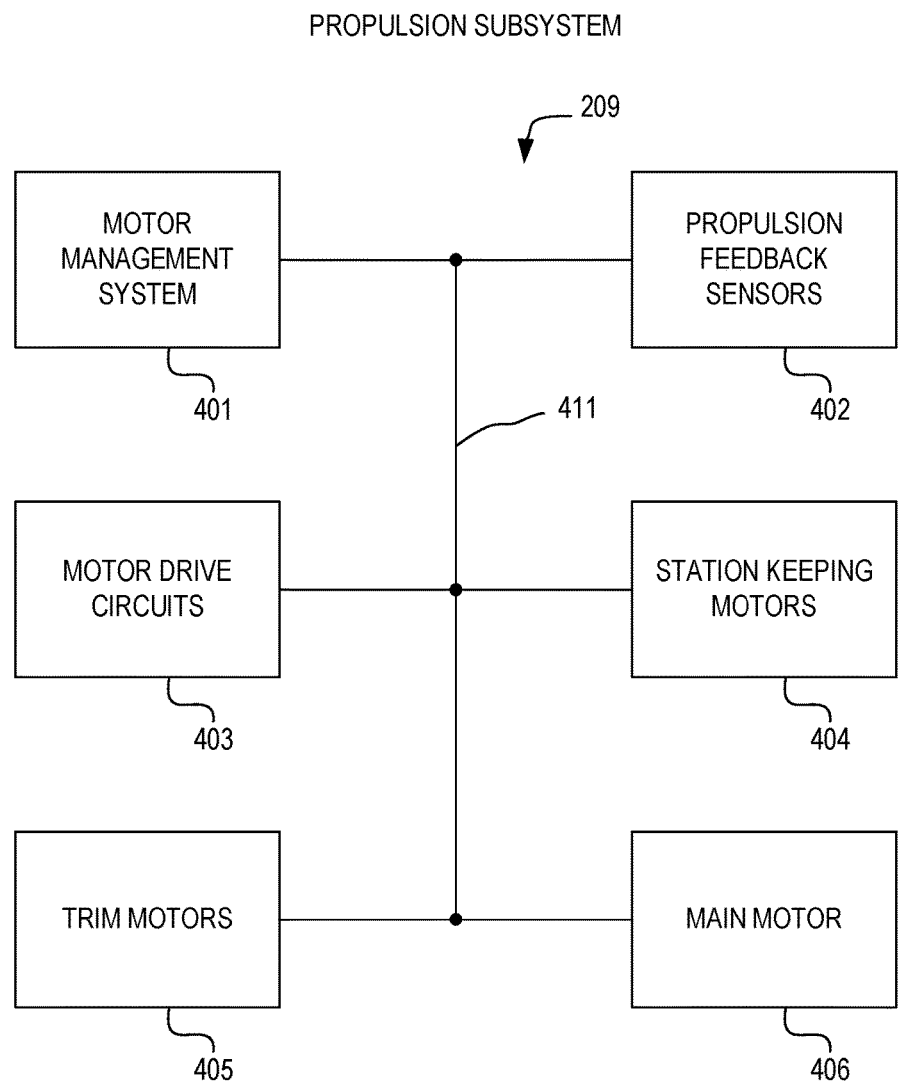
FIG. 4 is a block diagram illustrating a propulsion subsystem of an electronically controlled self-propelled device as may be used in a system in accordance with at least one embodiment.

FIG. 4 is a block diagram illustrating a propulsion subsystem of an electronically controlled self-propelled device as may be used in a system in accordance with at least one embodiment. Propulsion subsystem 209 comprises motor management system 401, propulsion feedback sensors 402, motor drive circuits 403, station keeping motors 404, trim motors 405, and main motor 406. Each of such elements is coupled to at least another of such elements. In the illustrated example, the elements are coupled to each other via interconnect 411.

Main motor 406 can provide main propulsion of an electronically controlled self-propelled device. Such main propulsion can allow an electronically controlled self-propelled device to move to a deployment location. Such main propulsion can also allow an electronically controlled self-propelled device to move in relation to other vessels, such as other instances of an electronically controlled self-propelled device and a formation of naval vessels. Trim motors 405 can provide propulsive force to counteract force that would change the orientation of an electronically controlled self-propelled device away from a desired orientation. As examples, trim motors 405 can compensate for forces that would tend to impart undesired pitch, yaw, and roll to an electronically controlled self-propelled device. Station keeping motors 404 can provide propulsive force to counteract currents that would cause an electronically controlled self-propelled device to drift away from its deployment location. As examples, station keeping motors 404 can be oriented along a plurality of axes, such as x, y, and z orthogonal axes, to allow station keeping in three dimensions. Motor drive circuits 403 are coupled to main motor 406, trim motors 405, and station keeping motors 404 to provide electrical motor drive signals to drive such motors. Power for the electrical motor drive signals can be obtained from power subsystem 210. Propulsion feedback sensors 402 can monitor the propulsion provided by the motors of propulsion subsystem 209. As an example, propulsion feedback sensors 402 can include pressure sensors to measure pressures produced by movement of water by propulsion system elements. As another example, propulsion feedback sensors 402 can include accelerometers to measure acceleration provided by propulsion system elements. Motor management system 401 can use information from propulsion feedback sensors 402 to cause motor drive circuits 403 to drive main motor 406, trim motors 405, and station keeping motors 404 to provide desired propulsion.

Figure 5:
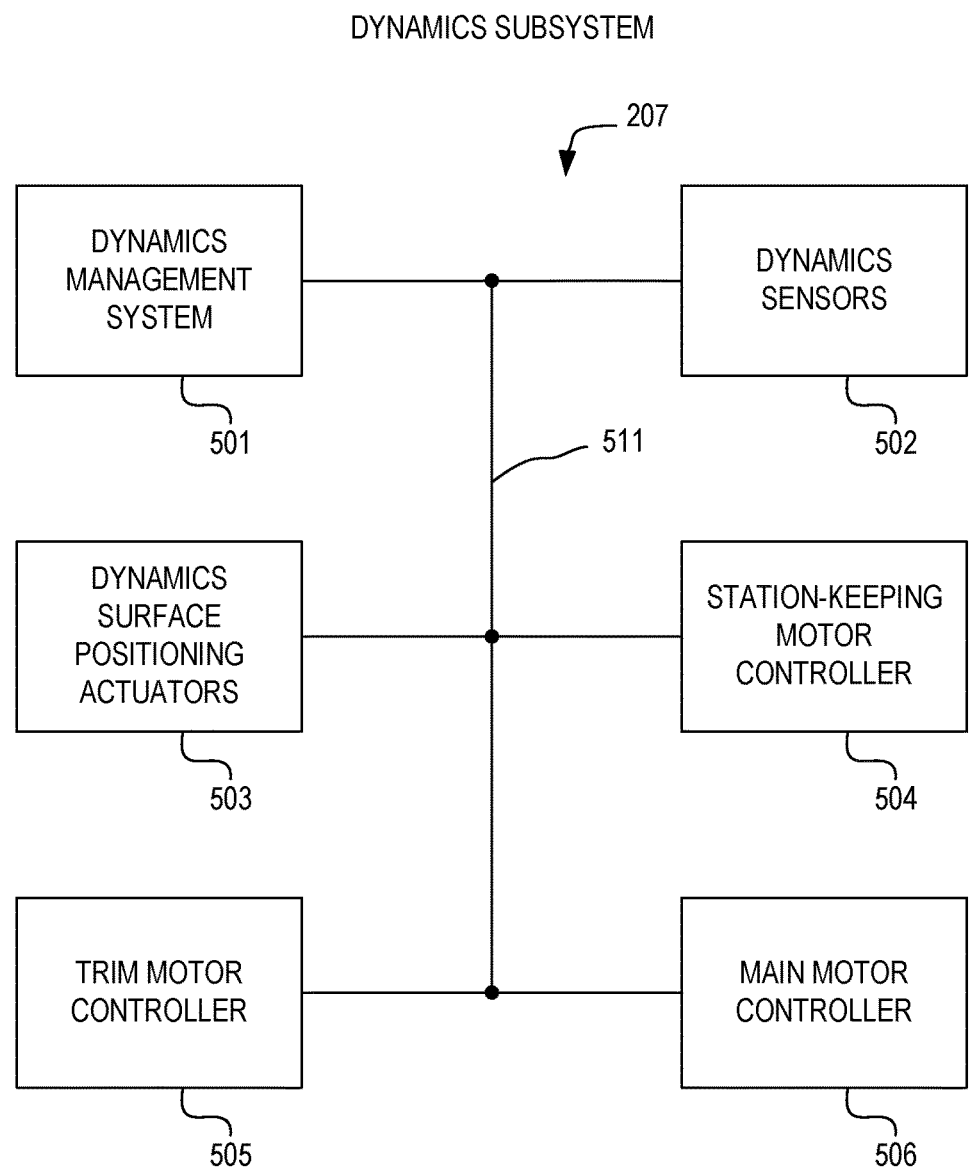
FIG. 5 is a block diagram illustrating a dynamics subsystem of an electronically controlled self-propelled device as may be used in a system in accordance with at least one embodiment.

FIG. 5 is a block diagram illustrating a dynamics subsystem of an electronically controlled self-propelled device as may be used in a system in accordance with at least one embodiment. Dynamics subsystem 207 comprises dynamics management system 501, dynamics sensors 502, dynamics surface positioning actuators 503, station-keeping motor controller 504, trim motor controller 505, and main motor controller 506. Each of such elements is coupled to at least another of such elements. In the illustrated example, the elements are coupled to each other via interconnect 511.

Dynamics sensors 502 sense dynamic forces and responsiveness of an electronically controlled self-propelled device to such dynamic forces. Examples of dynamic sensors 502 include pressure sensors, strain gauges, and fluid dynamics sensors. Dynamics management system 501 uses the sensed data from dynamics sensors 502 to provide dynamics control signals to dynamics surface positioning actuators 503, to main motor controller 506, to trim motor controller 505, and to station-keeping motor controller 504. Dynamics surface positioning actuators 503 can comprise, for example, actuators to orient hydrodynamic surfaces of an electronically controlled self-propelled device to adjust the responsiveness of an electronically controlled self-propelled device to hydrodynamic forces exerted upon it. Main motor controller 506, trim motor controller 505, and station-keeping motor controller 504 can provide dynamics control signals to adjust the operation of main motor 406, trim motors 405, and station keeping motors 404, respectively, as dictated by dynamics management system 501 in response to dynamics sensor data from dynamics sensors 502.

Figure 6:
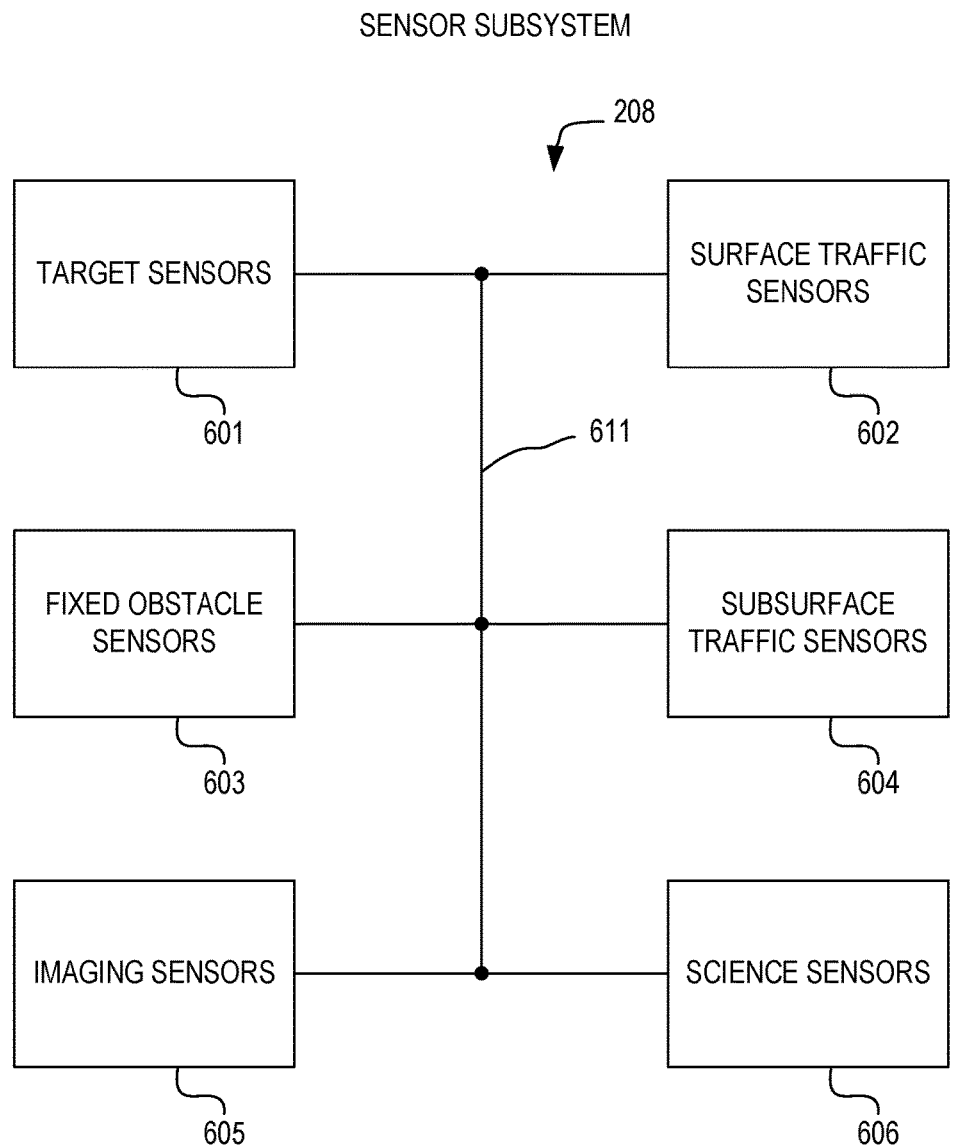
FIG. 6 is a block diagram illustrating a sensor subsystem of an electronically controlled self-propelled device as may be used in a system in accordance with at least one embodiment.

FIG. 6 is a block diagram illustrating a sensor subsystem of an electronically controlled self-propelled device as may be used in a system in accordance with at least one embodiment. Sensor subsystem 208 comprises target sensors 601, surface traffic sensors 602, fixed obstacle sensors 603, subsurface traffic sensors 604, imaging sensors 605, and science sensors 606. Each of such elements is coupled to at least another of such elements. In the illustrated example, the elements are coupled to each other via interconnect 611.

Target sensors 601 include sensors suitable for sensing a target suitable for engagement with ordnance subsystem 204 of an electronically controlled self-propelled device. Examples of target sensors 601 include a monostatic radar, a bistatic radar receiver, a bistatic radar transmitter, an infrared sensor, and a passive acoustic sensor. Surface traffic sensors 602 include sensors suitable for sensing traffic of surface vessels on a surface of water in which an electronically controlled self-propelled device operates. Examples of surface traffic sensors 602 include a monostatic radar, a bistatic radar receiver, a bistatic radar transmitter, an infrared sensor, an active acoustic sensor, and a passive acoustic sensor. Fixed obstacle sensors 603 include sensors suitable for sensing fixed obstacles. Examples of fixed obstacle sensors 603 include a monostatic radar, a bistatic radar receiver, a bistatic radar transmitter, an infrared sensor, an active acoustic sensor, a passive acoustic sensor, and a depth profiler. Subsurface traffic sensors 604 include sensors suitable for sensing traffic of subsurface vessels below a surface of water in which an electronically controlled self-propelled device operates. Examples of subsurface traffic sensors 604 include an active acoustic sensor, a passive acoustic sensor, and a magnetic sensor. The magnetic sensor may include, for example, a magnetometer or a magnetic anomaly detector. Imaging sensors 605 include sensors capable of obtaining images. Examples of imaging sensors 605 include visible still cameras, visible video cameras, infrared cameras, ultraviolet cameras, star tracking cameras, and other cameras. While sensors may be carried by one or more electronically controlled self-propelled devices, at least one sensor may be separable from an electronically controlled self-propelled device. As an example, one or more electronically controlled self-propelled devices may be configured to release a separable sensor package, such as a buoy or a ground-based sensor package. As an example, the separable sensor package may provide sensing based on a physical connection with a medium, such as water or earth, through which detectable signals may propagate. Accordingly, as examples, acoustic, magnetic, seismic, and other sensors may be separably deployed by one or more electronically controlled self-propelled devices.

Imaging sensors 605 can comprise sensors such as side scan sonar (SSS), synthetic aperture sonar (SAS), multibeam echosounders (MBES), imaging sonar, sub-bottom profiler (SBP), video cameras, still cameras, infrared cameras, multispectral cameras, and other types of imaging sensors. Science sensors 606 can comprise sensors such as conductivity, temperature, and depth (CTD) sensors, conductivity and temperature (CT) sensors, fluorometers, turbidity sensors, sound velocity sensors, beam attenuation meters, scattering meters, transmissometers, and magnetometers.

As examples of sensors that may be provided for monitoring a system that may or may not be self-propelled, audio sensors can be provided to detect sound resulting from arcing of electricity in an electric power distribution system, and electrical sensors measuring temperature can be provided to detect component overheating, for example, in a solid state electrical system.

Sensors can include sensors beyond visual sensors, such as temperature, pressure, location, direction, altitude, velocity, speed, depth, amperage, voltage, magnetic, and other types of sensors. For example, magnetic sensors can include magnetometers, flux gate sensors, Hall effect sensors, and others.

Figure 7:
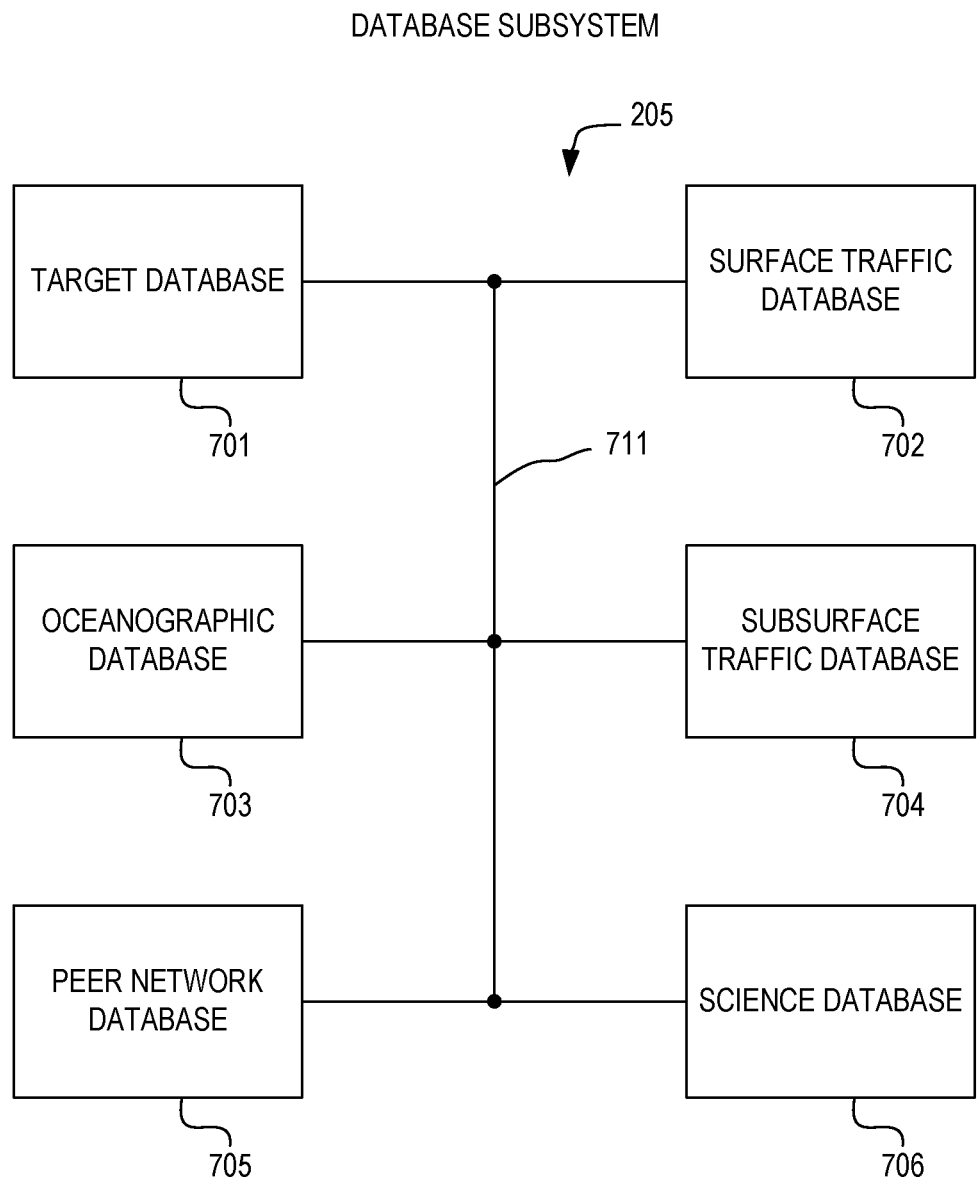
FIG. 7 is a block diagram illustrating a database subsystem of an electronically controlled self-propelled device as may be used in a system in accordance with at least one embodiment.

FIG. 7 is a block diagram illustrating a database subsystem of an electronically controlled self-propelled device as may be used in a system in accordance with at least one embodiment. Database subsystem 205 comprises target database 701, surface traffic database 702, oceanographic database 703, subsurface traffic database 704, peer network database 705, and science database 706. Each of such elements is coupled to at least another of such elements. In the illustrated example, the elements are coupled to each other via interconnect 711.

Target database 701 is a database for storing information characterizing potential targets and other information useful for distinguishing non-targets from targets. As examples, target database 701 may include information such as identification friend or foe (IFF) information, radar signature information, infrared signature information, and acoustic signature information as may pertain to aircraft. Surface traffic database 702 is a database for storing information characterizing potential surface traffic. As examples, surface traffic database 702 may include information such as radar signature information, infrared signature information, and acoustic signature information as may pertain to surface vessels. Oceanographic database 703 is a database for storing information characterizing physical features of the operating environment, such as an ocean, of an electronically controlled self-propelled device. As examples, oceanographic database 703 may include information as to ocean floor topography, ocean currents, islands, coastlines, and other features. Subsurface traffic database 704 is a database for storing information characterizing potential subsurface traffic. As examples, subsurface traffic database 704 may include information such as acoustic signature information as may pertain to subsurface vessels. Peer network database 705 is a database for storing information characterizing a relationship of an electronically controlled self-propelled device to other instances of an electronically controlled self-propelled device capable of operating cooperatively as peers with an electronically controlled self-propelled device. As examples, subsurface traffic database 704 may include information as to locations of peers, sensor parameters of peers, ordnance capabilities of peers, readiness of peers, and other properties of peers. Science database 706 is a database for storing information of a scientific nature, such as water temperature, water salinity, water conductivity, water density, water turbidity, air temperature, barometric pressure, sky conditions, and other information descriptive of conditions of the environment within which an electronically controlled self-propelled device operates.

Figure 8:
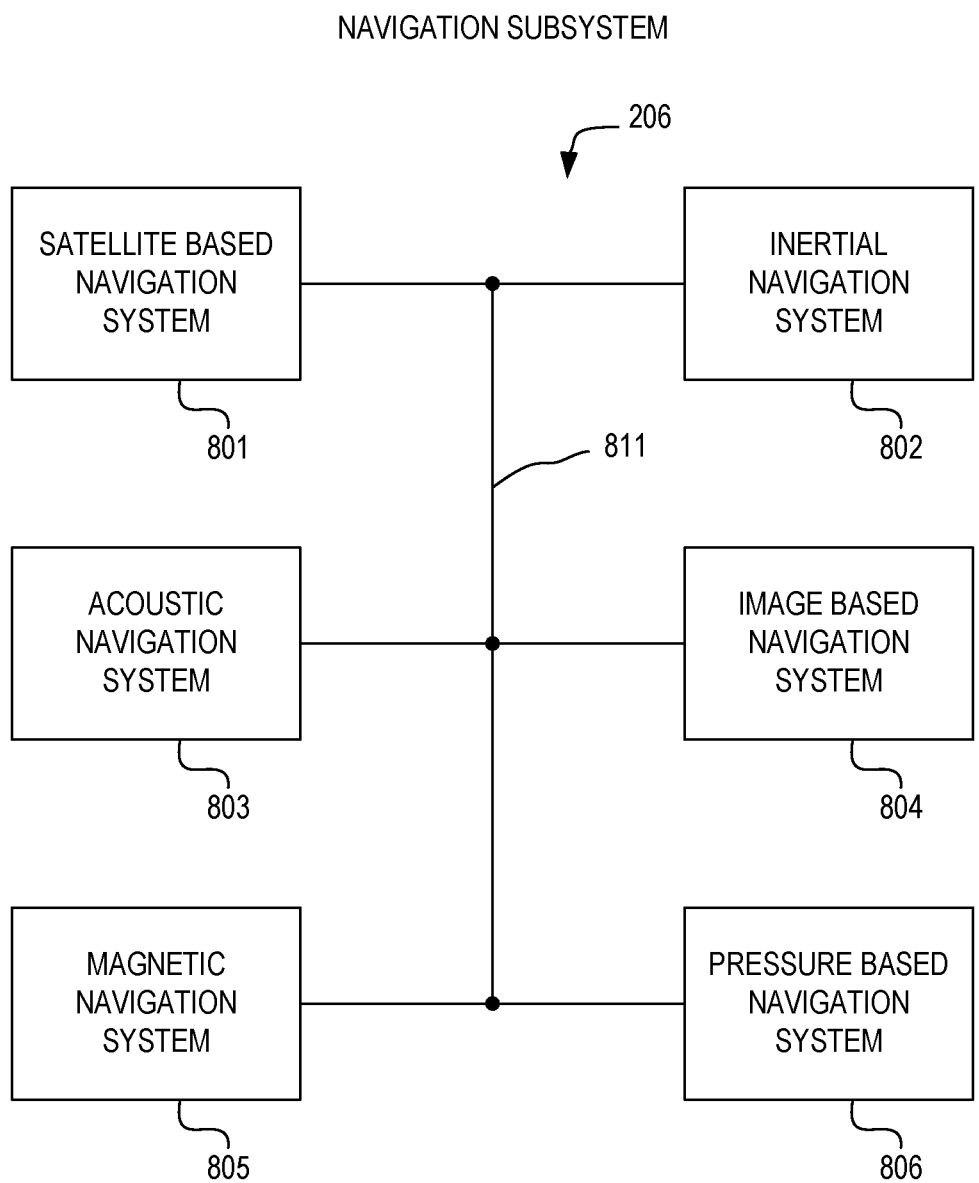
FIG. 8 is a block diagram illustrating a navigation subsystem of an electronically controlled self-propelled device as may be used in a system in accordance with at least one embodiment.

FIG. 8 is a block diagram illustrating a navigation subsystem of an electronically controlled self-propelled device as may be used in a system in accordance with at least one embodiment. Navigation subsystem 206 comprises satellite based navigation system 801, inertial navigation system 802, acoustic navigation system 803, image based navigation system 804, magnetic navigation system 805, and pressure based navigation system 806. Each of such elements is coupled to at least another of such elements. In the illustrated example, the elements are coupled to each other via interconnect 811.

Satellite based navigation system 801 can comprise, for example, a Global Navigation Satellite System (GLONASS) receiver and a Global Positioning System (GPS) receiver, which may include a Selective Availability/Anti-Spoofing Module (SAASM), a precise pseudo-random code (P-code) module, and an encrypted precise pseudo-random code (Y-code) module. Inertial navigation system 802 can comprise an inertial navigation sensor (INS) and an inertial measurement unit (IMU), which can comprise at least one of an accelerometer, a gyroscope, and a magnetometer.

Acoustic navigation system 803 can comprise, for example, Ultra Short Baseline (USBL) system, Long Baseline (LBL) system, a Doppler Velocity Logger (DVL), and an acoustic tracking transponder. Magnetic navigation system 805 can comprise, for example, a compass. Pressure based navigation system 806 can comprise, for example, an altimeter and a pressure sensor.

Figure 9:
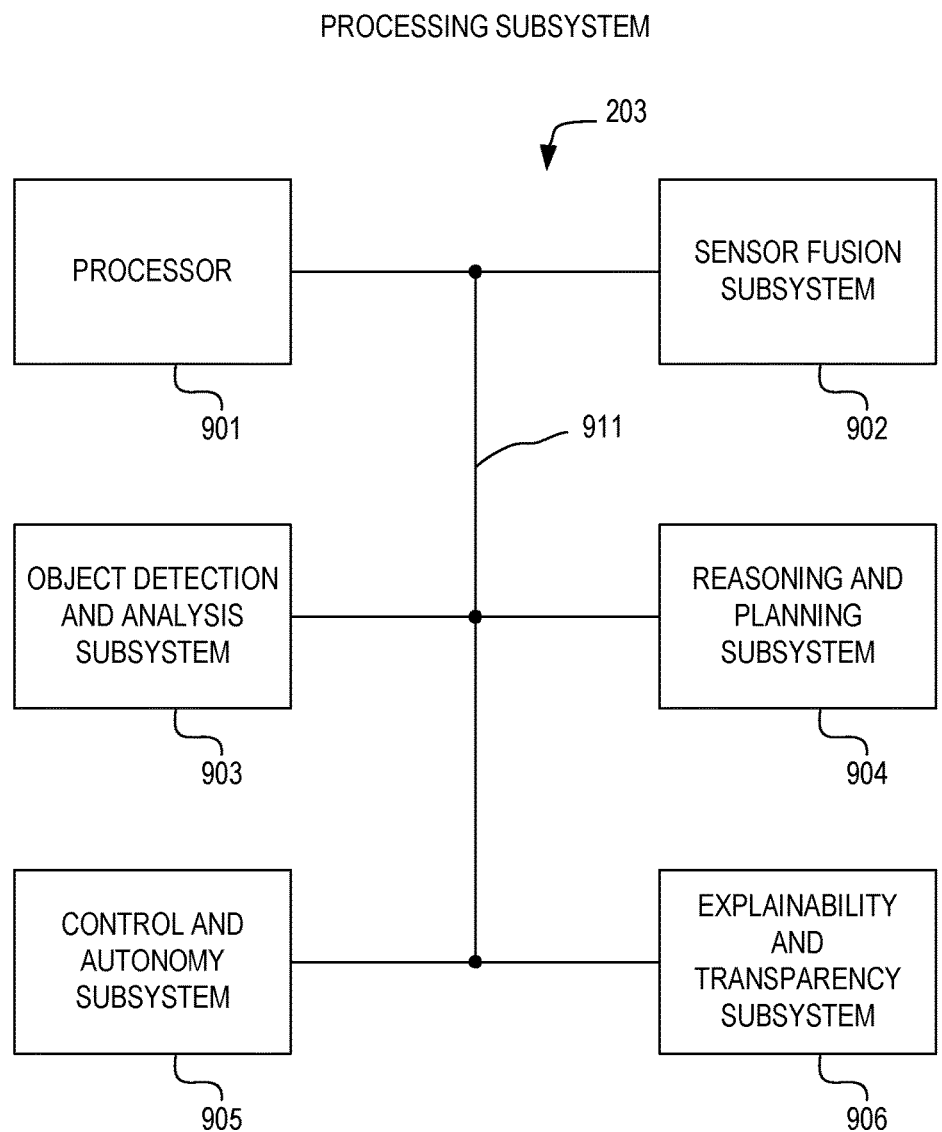
FIG. 9 is a block diagram illustrating a processing subsystem of an electronically controlled self-propelled device as may be used in a system in accordance with at least one embodiment.

FIG. 9 is a block diagram illustrating a processing subsystem of an electronically controlled self-propelled device as may be used in a system in accordance with at least one embodiment. Processing subsystem 203 comprises processor 901, sensor fusion subsystem 902, object detection and analysis subsystem 903, reasoning and planning subsystem 904, control and autonomy subsystem 905, and explainability and transparency subsystem 906. Each of such elements is coupled to at least another of such elements. In the illustrated example, the elements are coupled to each other via interconnect 911.

Processor 901 is a data processor for processing information within an electronically controlled self-propelled device. Processor 901 can cooperate with subsystems of processing subsystem 203, such as sensor fusion subsystem 902, object detection and analysis subsystem 903, reasoning and planning subsystem 904, control and autonomy subsystem 905, and explainability and transparency subsystem 906. As one example, processing subsystem 203 can be implemented to utilize heterogeneous computing, wherein the different elements of processing subsystem 203 are implemented using different configurations of processor circuits, in accordance with at least one embodiment. As another example, a homogeneous computing system comprising similar configurations of processor circuits, such as a symmetric multiprocessor (SMP) system, can be used to implement processing subsystem 203.

Sensor fusion subsystem 902 processes sensor data obtained by sensors, such as sensors of sensor subsystem 208. Sensor data can be obtained from sensors local to an electronically controlled self-propelled device or from remote sensors located elsewhere, for example, on other instances of an electronically controlled self-propelled device, on other vessels, or on other platforms, such as satellites, aircraft, or fixed locations. Sensor fusion subsystem 902 provides fidelity enhancement with multi-sensor feeds. As an example, sensor fusion subsystem 902 compares sensor data from multiple sensors to cross-validate the sensor data. The sensor data being cross-validated can be homogeneous, having been obtained from different instances of a similar type of sensor, can be heterogeneous, having been obtained from different types of sensors, or can have homogeneous and heterogeneous aspects, having been obtained from different instances of a similar type of sensor for each of a plurality of different types of sensors.

Sensor fusion subsystem 902 provides noise reduction and bad data identification via deep artificial neural networks (ANNs). Deep artificial neural networks are configured to recognize spurious data that, if relied upon, could lead to improper decision making. The deep artificial neural networks can acquire knowledge that can be stored within the adaptive elements of the deep artificial neural networks, and that acquired knowledge can be used for subsequent decision making. As an example, as a wide range of sensor data is obtained over time, sensor fusion subsystem 902 can learn to distinguish between, as examples, civilian aircraft, friendly military aircraft, and hostile military aircraft.

Sensor fusion subsystem 902 provides automated feature construction and evolution. By processing sensor data to identify features of a potential target that can be recognized from the information provided by the sensor data and adaptively modifying the processing of the sensor data over time to improve the identification of such features, feature recognition provided by sensor fusion subsystem 902 can improve identification of actual targets from among potential targets.

Sensor fusion subsystem 902 can combine augmented reality (AR) with virtual reality (VR) and predictive algorithms to facilitate application of information obtained from sensors to create an easily comprehensible presentation of a situation. For example, sensor fusion subsystem 902 can effectively filter out extraneous information, such as weather conditions and countermeasure effects, to provide a clear presentation of a target. The presentation of the target can be made with respect to an electronically controlled self-propelled device, for example, with respect to the engagement range of the ordnance of ordnance subsystem 204 of an electronically controlled self-propelled device.

Object detection and analysis subsystem 903 utilizes machine vision techniques to process sensor data to recognize an object the sensor data represents. Object detection and analysis subsystem 903 provides multi-spectral, cross-sensor analysis of sensor data, correlating sensor data of different types and of different sensors to assemble an accurate characterization of a detected object. Object detection and analysis subsystem 903 can perform new object discovery, utilizing unsupervised learning, which can identify the presence of new types of objects not previously known to exist or not previously having been identifiable based on previous processing of sensor data. Object detection and analysis subsystem 903 can provide a comprehensive vision of detectable objects and can apply ontologies to characterize such objects and their potential significance in a battlespace.

Reasoning and planning subsystem 904 can apply strategy generation techniques and strategy adaptation techniques to develop and adapt a strategy for protecting an electronically controlled self-propelled device and other assets in concert with which an electronically controlled self-propelled device may be deployed, for example, other instances of an electronically controlled self-propelled device and naval vessels that may be protected by an electronically controlled self-propelled device. Reasoning and planning subsystem 904 can apply reality vectors to provide a thought-vector-like treatment of a real state of an electronically controlled self-propelled device and its surroundings. Reasoning and planning subsystem 904 can apply reinforcement learning and evolutionary processes to accumulate knowledge during the course of its operation.

Control and autonomy subsystem 905 utilizes platforms to transform a large amount of data into situational awareness. For example, control and autonomy subsystem 905 can utilize simulation engines to transform data, such as sensor data and object information obtained from sensor data, into an understanding of the situation faced by an electronically controlled self-propelled device that allows control and autonomy subsystem 905 to initiate action, such as engagement of a target using the ordnance of ordnance subsystem 204. Control and autonomy subsystem 905 can utilize reinforcement learning applications to evolve controllers, which can be used to autonomously control an electronically controlled self-propelled device. Control and autonomy subsystem 905 can utilize swarm constrained deep learning for distributed decision making.

Control and autonomy subsystem 905 can coordinate flight of a plurality of unmanned combat aerial vehicles (UCAVs), for example, to create a swarm of UCAVs. The swarm parameters can be configured to assure safe separation of UCAVs from each other but a swarm configuration of appropriate density to provide interception of airborne threats. As an example, the swarm parameters can be selected to provide an evenly spaced distribution of UCAVs. As another example, the swarm parameters can be selected to provide a weighted distribution of UCAVs. The weighted distribution can have a greater density of UCAVs over a space in which a threat is expected to have a higher likelihood of flying and a lesser density of UCAVs over another space in which a threat is expected to have a lower likelihood of flying.

Control and autonomy subsystem 905 can interact with other subsystems, such as sensor subsystem 208 and tracking subsystem 202 to adaptively control the operation of the UCAVs via communications subsystem 201.

Explainability and transparency subsystem 906 can perform analysis and observation by applying natural language processing (NLP) and natural language generation (NLG) to produce natural language reports. Explainability and transparency subsystem 906 can perform hypothesis validation, enabling autonomous research to be performed by an electronically controlled self-propelled device. Explainability and transparency subsystem 906 can perform automated ontology discovery, allowing an electronically controlled self-propelled device to recognize and respond to threats that do not fit within an existing knowledge base of threats.

Figure 10:
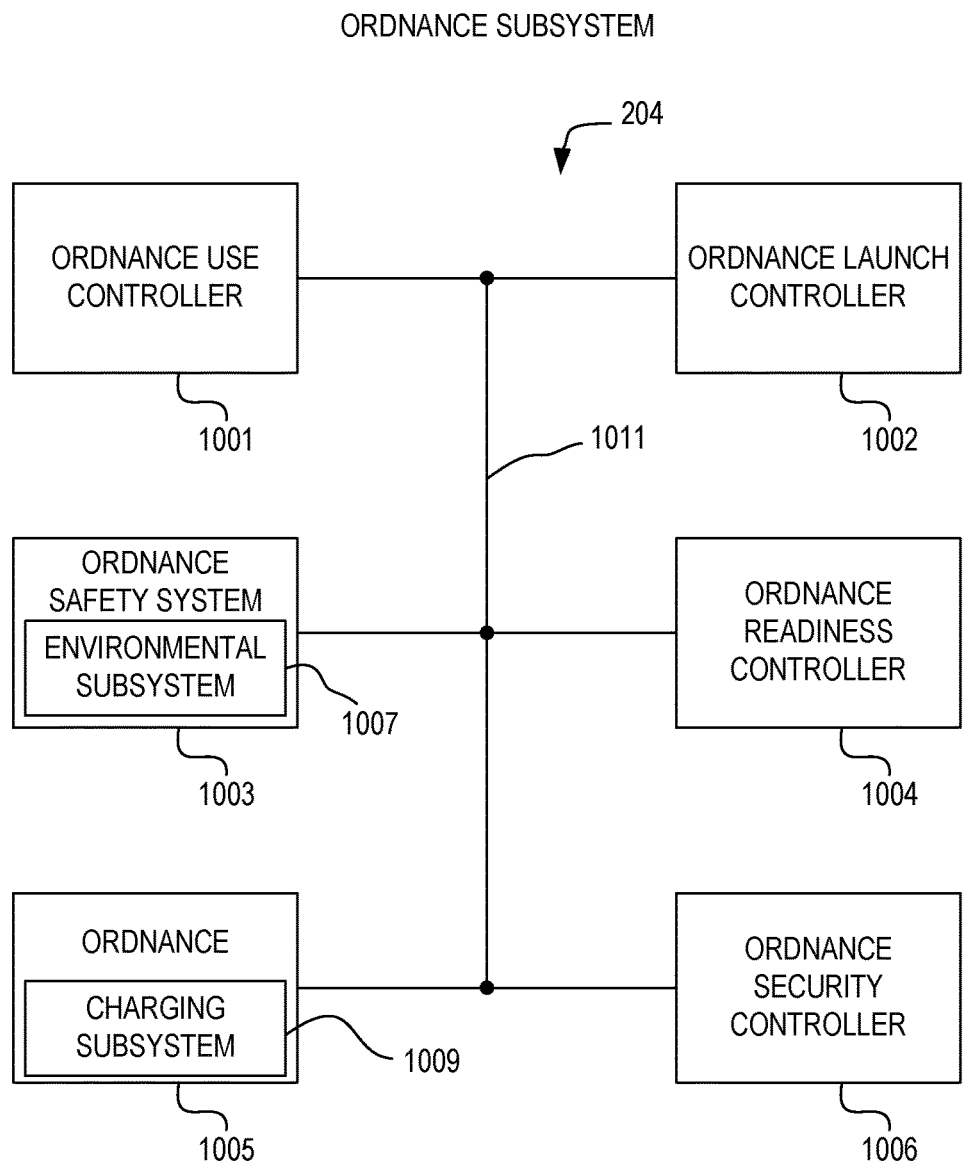
FIG. 10 is a block diagram illustrating an ordnance subsystem of an electronically controlled self-propelled device as may be used in a system in accordance with at least one embodiment.

FIG. 10 is a block diagram illustrating an ordnance subsystem of an electronically controlled self-propelled device as may be used in a system in accordance with at least one embodiment. Ordnance subsystem 204 comprises ordnance use controller 1001, ordnance launch controller 1002, ordnance safety system 1003, ordnance readiness controller 1004, ordnance 1005, and ordnance security controller 1006.

Each of such elements is coupled to at least another of such elements. In the illustrated example, the elements are coupled to each other via interconnect 1011. Ordnance safety system 1003 comprises environmental subsystem 1007.

Ordnance 1005 may, for example, be an UCAV carrying an explosive payload. For example, the explosive payload may comprise an explosive charge in an unprefragmented housing, an explosive charge in a prefragmented housing, thermobaric explosive payload, an electromagnetic explosive payload, or another type of explosive payload. Ordnance 1005 may comprise a charging subsystem 1009, which may, for example, cooperate with power subsystem 210 to allow charging (and subsequent recharging) of ordnance 1005. As an example, ordnance 1005 in the form of a UCAV can include a rechargeable battery to power a propulsion system, such as a propeller system. Charging subsystem 1009 can charge the rechargeable battery of the UCAV. The UCAV can be deployed on multiple sorties, being recharged from time to time to continue to power the propulsion system over the multiple sorties. The rechargeable battery of the UCAV can also power other systems of the UCAV besides the propulsion system.

Ordnance security controller 1006 can operate to maintain security of ordnance 1005. As an example, ordnance security controller 1006 can be configured to detect tampering with an electronically controlled self-propelled device that poses a security risk to ordnance 1005. Ordnance security controller 1006 can be configured, for example, to temporarily or permanently disable ordnance 1005 in response to a detected security risk.

Ordnance safety system 1003 can monitor conditions affecting safety of ordnance 1005. As an example, ordnance safety system 1003 can include environmental subsystem 1007. Environmental subsystem 1007 can monitor environmental conditions to which ordnance 1005 is exposed. Based on the monitored environmental conditions, ordnance safety system 1003 can determine whether the safety of ordnance 1005 has been compromised. In the event of the safety has been compromised, ordnance safety system 1003 can communicate a warning to other components of ordnance subsystem 204, such as to ordnance readiness controller 1004, ordnance use controller 1001, and ordnance launch controller 1002 to warn of potential safety risks concerning ordnance 1005. The other components can perform risk mitigation actions, such as inhibiting launch of ordnance 1005, rendering ordnance 1005 inert, or jettisoning ordnance 1005. The jettison process can be coordinated with other subsystems, such navigation subsystem 206, sensor subsystem 208, and database subsystem 205, to command self-destruction of ordnance 1005 after ordnance 1005 has been jettisoned to a safe location.

Ordnance readiness controller 1004 manages readiness of ordnance 1005 for use. Ordnance readiness controller 1004 can receive ordnance security information from ordnance security controller 1006, ordnance safety information from ordnance safety system 1003, and ordnance self-test information from ordnance 1005. Ordnance readiness controller 1004 can use such information to determine an overall readiness of ordnance 1005 for use.

Ordnance use controller 1001 manages confirmation of authority to use ordnance 1005. For example, ordnance use controller can receive a message via communications subsystem 1101, which may have been decrypted via cryptographic system 1106, to authorize the use of ordnance 1005 or alternatively, to delegate the authority to use ordnance 1005 to processing subsystem 203, allowing an electronically controlled self-propelled device to use ordnance 1005 autonomously.

Ordnance launch controller 1002 controls a launch sequence of ordnance 1005 when ordnance use controller 1001 has confirmed authority to use ordnance 1005. Ordnance launch controller 1002 monitors conditions for a safe launch of ordnance 1005 and is able to inhibit launch when such conditions are not met and to proceed with launch when such conditions are met.

Figure 11:
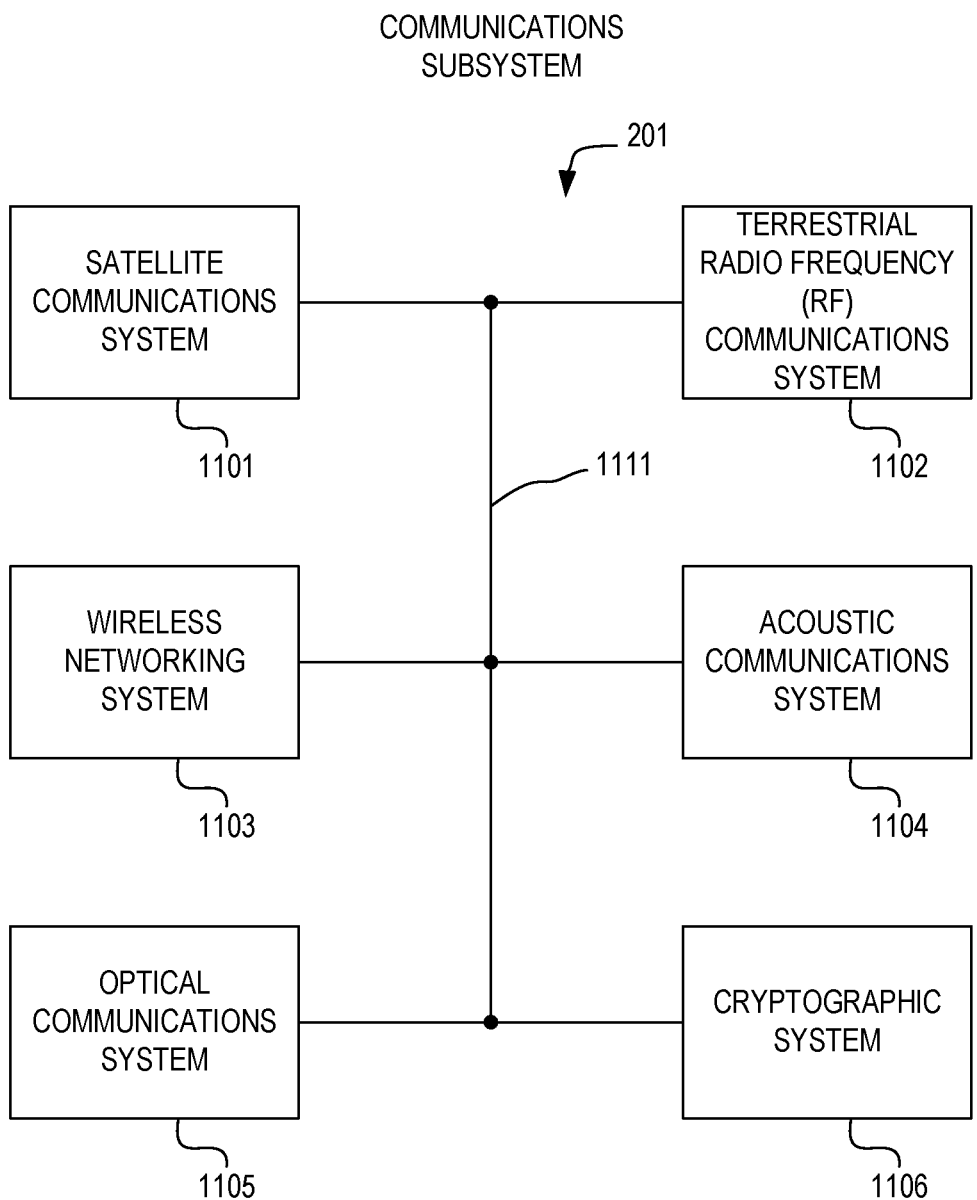
FIG. 11 is a block diagram illustrating a communications subsystem of an electronically controlled self-propelled device as may be used in a system in accordance with at least one embodiment.

FIG. 11 is a block diagram illustrating a communications subsystem of an electronically controlled self-propelled device as may be used in a system in accordance with at least one embodiment. Communications subsystem 201 comprises satellite communications system 1101, terrestrial radio frequency (RF) communications system 1102, wireless networking system 1103, acoustic communications system 1104, optical communications system 1105, and cryptographic system 1106. Each of such elements is coupled to at least another of such elements. In the illustrated example, the elements are coupled to each other via interconnect 1111.

Satellite communications system 1101 can comprise, for example, a Fleet Satellite Communications System (FLT-SATCOM) transceiver, an Ultra High Frequency (UHF) Follow-On (UFO) transceiver, a Mobile User Objective System (MUOS) transceiver, and a commercial satellite transceiver, such as an IRIDIUM satellite transceiver. Terrestrial RF communications system 1102 can comprise, for example, a terrestrial RF modem operating on one or more bands, such as a High Frequency (HF) band, a Very High Frequency (VHF) band, an Ultra High Frequency (UHF) band, and a microwave (µwave) band. Wireless networking system 1103 can comprise a WIFI wireless network transceiver (WIFI is a registered trademark of Wi-Fi Alliance), a BLUETOOTH wireless network transceiver (BLUETOOTH is a registered trademark of Bluetooth SIG, Inc.), a WIGIG wireless network transceiver (WIGIG is a registered trademark of Wi-Fi Alliance), and another type of wireless network transceiver. Acoustic communications system 1104 can comprise an acoustic modem. Optical communications system 1105 may comprise, for example, a blue/green laser communications system.

Communications subsystem 201 can communicate, for example, with a supervisory node wirelessly connected to an electronically controlled self-propelled device. As an example, communications subsystem 201 can use wireless networking system 1103 to create a communications network with the supervisory node. As one example, such as communications network can be a mesh network, wherein the plurality of electronically controlled self-propelled devices can relay messages amongst themselves to extend the networking range. The relayed messages may originate, for example, from an electronically controlled self-propelled device or from another node in communication with an electronically controlled self-propelled device. The relayed messages may be destined, for example, for node, such as a supervisory node, or one of the plurality of electronically controlled self-propelled devices.

Figure 12:
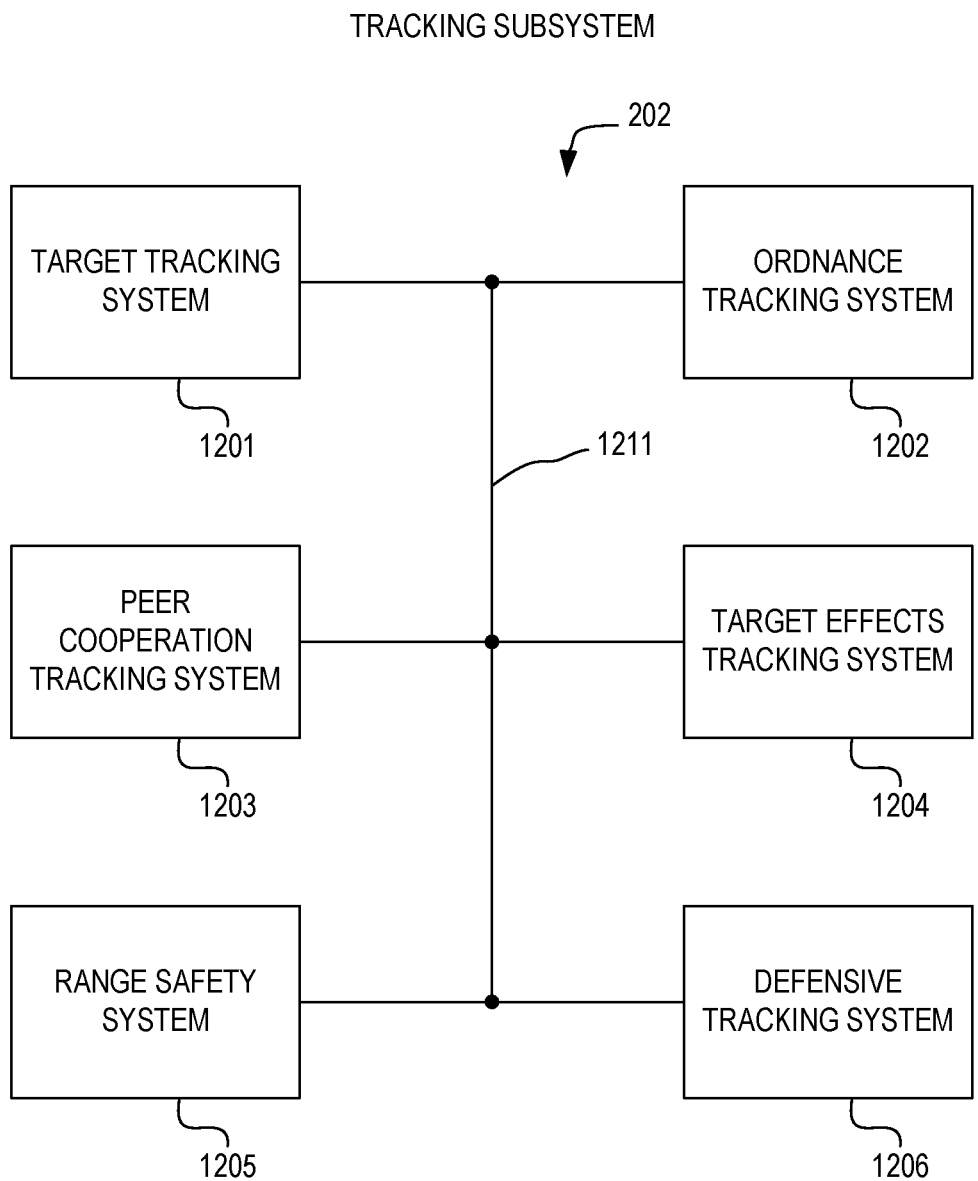
FIG. 12 is a block diagram illustrating a tracking subsystem of an electronically controlled self-propelled device as may be used in a system in accordance with at least one embodiment.

FIG. 12 is a block diagram illustrating a tracking subsystem of an electronically controlled self-propelled device as may be used in a system in accordance with at least one embodiment. Tracking subsystem 202 comprises target tracking system 1201, ordnance tracking system 1202, peer cooperation tracking system 1203, target effects tracking system 1204, range safety system 1205, and defensive tracking system 1206. Each of such elements is coupled to at least another of such elements. In the illustrated example, the elements are coupled to each other via interconnect 1211.

Target tracking system 1201 provides an ability to track a target acquired by sensor subsystem 208. Peer cooperation tracking system 1203 provides an ability to cooperate with the tracking subsystems of other instances of an electronically controlled self-propelled device, allowing such other instances to act as peers in tracking. Defensive tracking system 1206 allows an electronically controlled self-propelled device to track threats against itself. Ordnance tracking system 1202 tracks ordnance 1005 after ordnance 1005 is launched to engage a target. Target effects tracking system 1204 tracks the effects of ordnance 1005 on the target. Range safety system 1205 obtains ordnance trajectory information as to the trajectory of ordnance 1005, for example, from ordnance tracking system 1202. Range safety system 1205 can take protective action, for example, commanding destruction of ordnance 1005, if ordnance 1005 fails to maintain its intended trajectory.

Figure 13:
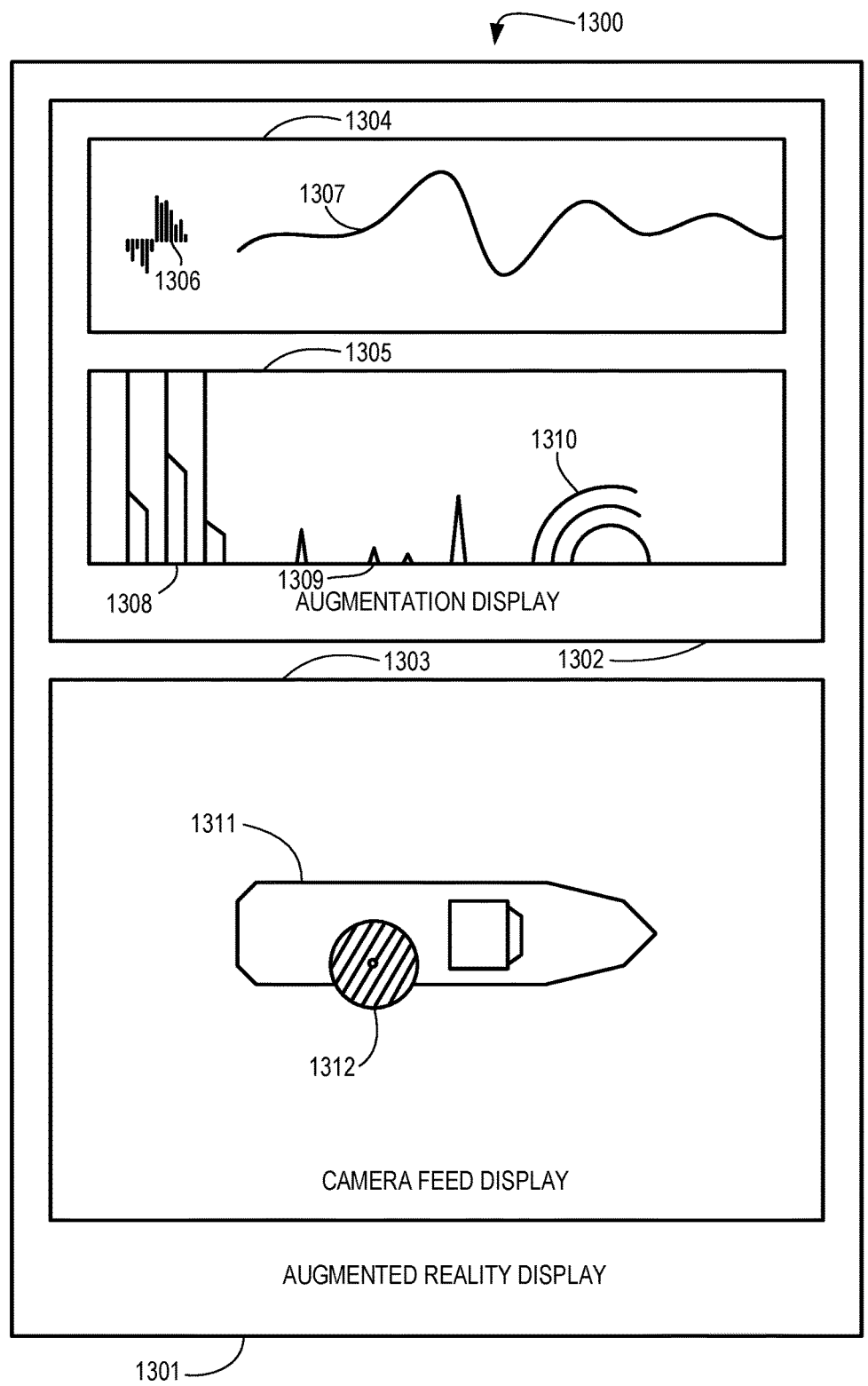
FIG. 13 is a diagram illustrating a graphic user interface (GUI) of display of a command and control system in accordance with at least one embodiment.

FIG. 13 is a diagram illustrating a graphic user interface (GUI) of display 105 of a command and control system in accordance with at least one embodiment. GUI 1300 comprises an augmented reality (AR) display 1301. The AR display 1301 combines an image portion obtained from a camera with an image portion synthesized from information provided to processor 103. As an example, the AR display 1301 comprises a camera feed display 1303 and an augmentation display 1302. The camera feed display 1303 can depict an image portion as seen by a camera, such as image portion 1311. Camera feed display 1303 can be modified by processor 103 to include additional information, such as processor-generated image portion 1312, which, as shown, can be superimposed over image portion 1311. As an example, the processor-generated image portion 1312 can highlight a localized area of image portion 1311

Augmentation display 1302 comprises processor-generated image portions, such as image portions 1304 and 1305. Image portion 1304 contains image elements, such as bar graph 1306 and line graph 1307. Image portion 1305 contains image elements, such as bar graphs 1308 and 1309 and arc graph 1310. The image elements may, for example, pictorially represent information such as remaining useful life, cognitive prognostic information, equipment malfunction alerting information, and subsystem-level asset health prediction information.

Figure 14:
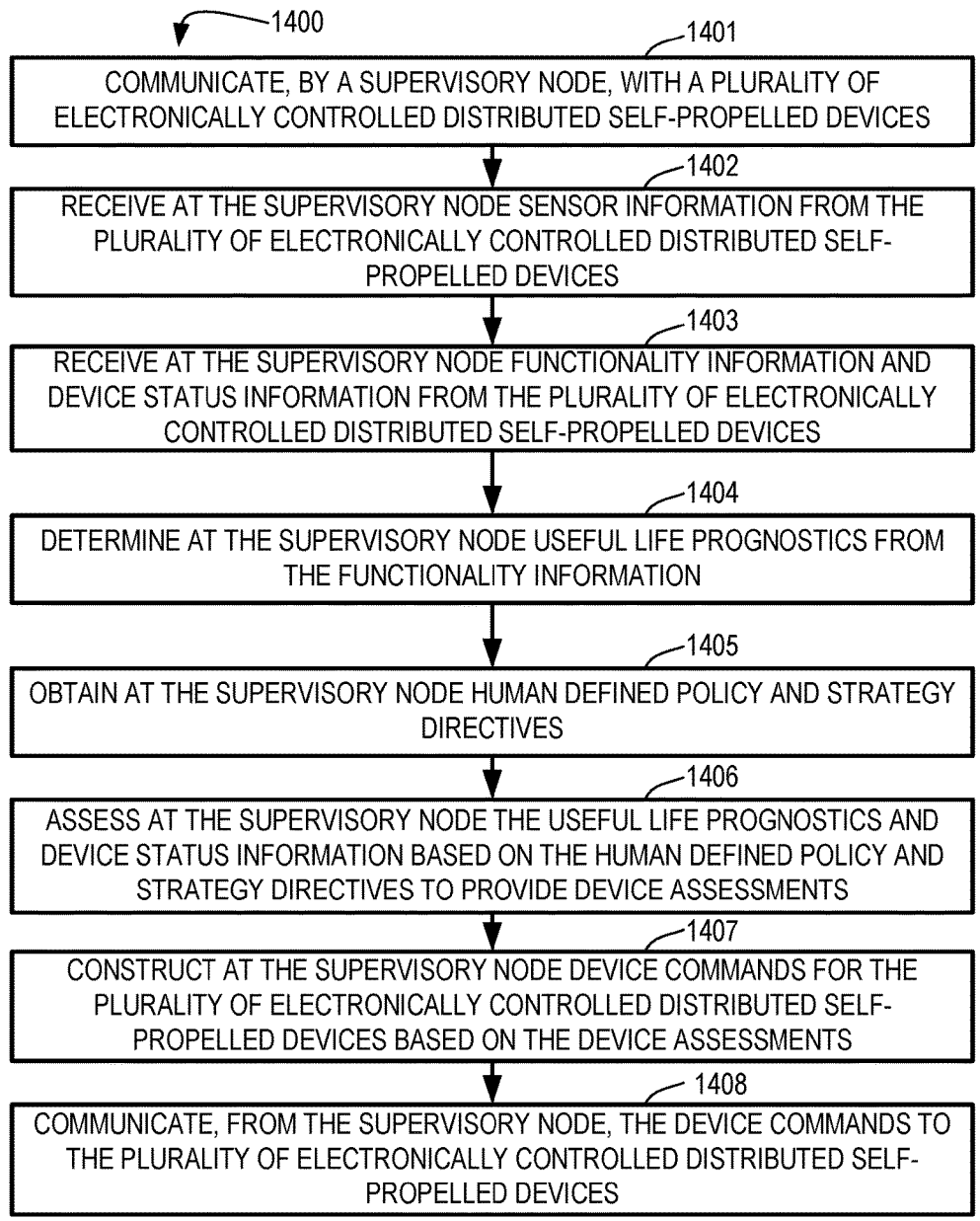
FIG. 14 is a flow diagram illustrating a method in accordance with at least one embodiment.

FIG. 14 is a flow diagram illustrating a method in accordance with at least one embodiment. Method 1400 begins at block 1401, where a supervisory node communicates with a plurality of electronically controlled distributed self-propelled devices. From block 1401, method 1400 continues to block 1402. At block 1402, the supervisory node receives sensor information from the plurality of electronically controlled distributed self-propelled devices. From block 1402, method 1400 continues to block 1403. At block 1403, the supervisory node receives functionality information and device status information from the plurality of electronically controlled distributed self-propelled devices. From block 1403, method 1400 continues to block 1404. At block 1404, the supervisory node determines useful life prognostics from the functionality information. From block 1404, method 1400 continues to block 1405. At block 1405, the supervisory node obtains human defined policy and strategy directives. From block 1405, method 1400 continues to block 1406. At block 1406, the supervisory node assesses the useful life prognostics and device status information based on the human defined policy and strategy directives to provide device assessments. From block 1406, method 1400 continues to block 1407. At block 1407, the supervisory node constructs device commands for the plurality of electronically controlled distributed self-propelled devices based on the device assessments. In a particular implementation, the processor is configured to arbitrate between automated control instructions generated by the processor and human-generated control instructions received via the human command input interface and to construct the device commands based on the device assessments and arbitrated control instructions obtained by arbitrating. From block 1407, method 1400 continues to block 1408. At block 1408, the supervisory node communicates the device commands to the plurality of electronically controlled distributed self-propelled devices.

Figure 15:
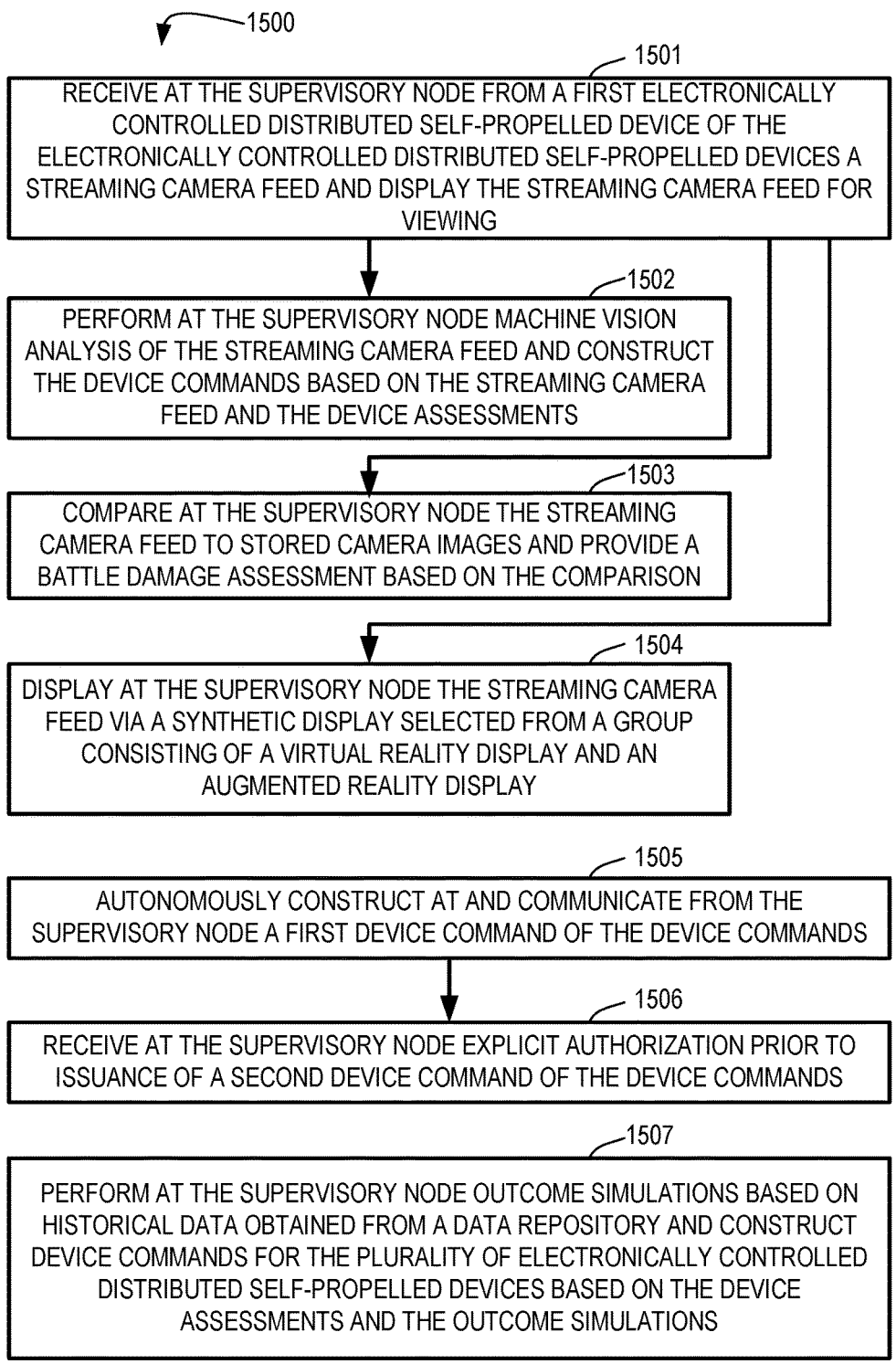
FIG. 15 is a flow diagram illustrating additional blocks that may be implemented singly or in combination in conjunction with the method of illustrated in FIG. 14.

FIG. 15 is a flow diagram illustrating additional blocks that may be implemented singly or in combination in conjunction with the method of illustrated in FIG. 14. Additional blocks 1500 comprise block 1501 by itself or in conjunction with any of blocks 1502, 1503, and 1504; block 1505 by itself or in conjunction with block 1506; and block 1507. Any or all of additional blocks 1500 can be performed as optional portions of method 1400. At block 1501, a supervisory node receives from a first electronically controlled distributed self-propelled device of the electronically controlled distributed self-propelled devices a streaming camera feed and displays the streaming camera feed for viewing. Following block 1501, as one example, block 1502 may be performed. At block 1502, the supervisory node performs machine vision analysis of the streaming camera feed and constructs the device commands based on the streaming camera feed and the device assessments. As another example, following block 1501, block 1503 may be performed. At block 1503, the supervisory node compares the streaming camera feed to stored camera images and provides a battle damage assessment based on the comparison. As yet another example, following block 1501, block 1504 may be performed. At block 1504, the supervisory node displays the streaming camera feed via a synthetic display, such as a virtual reality display or an augmented reality display.

At block 1505, the supervisory node autonomously constructs and communicates to a first electronically controlled distributed self-propelled device of the plurality of electronically controlled distributed self-propelled devices a first device command of the device commands. Optionally, following block 1505, as shown in block 1506, the supervisory node can receive explicit authorization prior to issuance of a second device command of the device commands. At block 1507, the supervisory node performs outcome simulations based on historical data obtained from a data repository and constructs device commands for the plurality of electronically controlled distributed self-propelled devices based on the device assessments and the outcome simulations.

Figure 16:
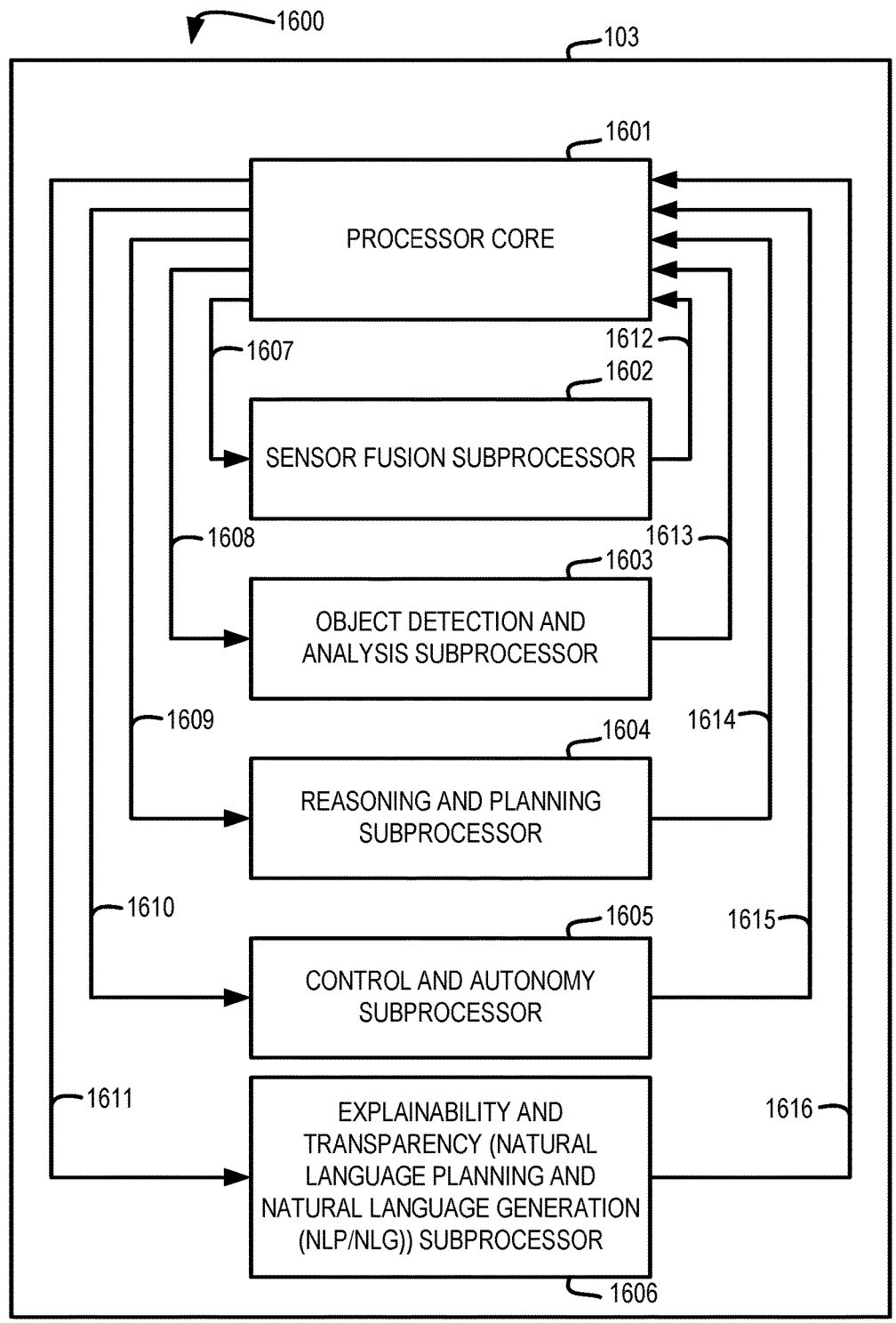
FIG. 16 is a block diagram illustrating an embodiment of processor of the command and control system illustrated in FIG. 1.

FIG. 16 is a block diagram illustrating an embodiment of processor 103 of the command and control system illustrated in FIG. 1. Embodiment 1600 of processor 103 comprises processor core 1601, sensor fusion subprocessor 1602, object detection and analysis subprocessor 1603, reasoning and planning subprocessor 1604, control and autonomy subprocessor 1605, and explainability and transparency subprocessor 1606. Explainability and transparency subprocessor 1606 performs natural language planning (NLP) and natural language generation (NLG). Processor core 1601 can provide sensor information to sensor fusion subprocessor 1602 via path 1607. Sensor fusion subprocessor 1602 can return via path 1612 information representing enhanced sensor information synthesized from the sensor information. Sensor fusion subprocessor 1602 can provide fidelity enhancement of the sensor information by identifying and removing spurious data from a sensor while processing multi-sensor feeds. Sensor fusion subprocessor 1602 can provide noise reduction and bad data identification and elimination, for example, using deep artificial neural networks (ANNs). Sensor fusion subprocessor 1602 can provide automated feature construction and evolution by assembling and interpolating data from multiple sensors. Sensor fusion subprocessor 1602 can implement augmented reality and virtual reality techniques and predictive algorithms for synthesizing and extrapolating an enhanced data set comprising the enhanced sensor data.

Processor core 1601 can provide the enhanced sensor information to object detection and analysis subprocessor 1603 via path 1608. Object detection and analysis subprocessor 1603 can provide information representative of objects detected from the enhanced sensor information via path 1613 to processor core 1601. Object detection and analysis subprocessor 1603 can implement machine vision algorithms to identify objects within an image provided by the enhanced sensor information. Object detection and analysis subprocessor 1603 can perform multi-spectral, cross-sensor analysis to view objects to be detected from multiple perspectives. Object detection and analysis subprocessor 1603 can perform new object discovery in an unsupervised mode, where the discovery of new objects is not bound by existing rules for discovering known objects. Object detection and analysis subprocessor 1603 can form visions and ontologies based on relationships among detected objects.

Processor core 1601 can provide information representative of detected objects to reasoning and planning subprocessor 1604 via path 1609. Reasoning and planning subprocessor 1604 can implement strategy generation algorithms and strategy adaptation based on the detected objects. Reasoning and planning subprocessor 1604 can process reality vectors, which provides a thought-vector-like treatment of real state as determined from the visions and ontologies of the detected objects. Reasoning and planning subprocessor 1604 can perform reinforcement learning and evolutionary algorithms to identify similarities and patterns among multiple instances of the visions and ontologies of the detected objects to learn typical appearances and behaviors of the detected objects. The reinforcement learning can disregard anomalous results, as the inconsistency of an anomaly with typical patterns can prevent the anomalous results from being incorporated into the reinforcement learning. The evolutionary algorithms can identify gradual changes which the detected objects can reasonably undergo, while disregarding implausibly large and rapid changes. Reasoning and planning subprocessor 1604 can provide the reality vectors and higher level characterizations of the detected objects to processor core 1601 via path 1614.

Processor core 1601 can provide the reality vectors and higher level characterizations of the detected objects to control and autonomy subprocessor 1605 via path 1610. Control and autonomy subprocessor 1605 can provide platforms to transform the voluminous data obtained as described above to simulations in simulation engines. The simulations can be evaluated to select a preferred decision to be implemented autonomously for some decisions (e.g., less profoundly consequential decisions) or as guided by human defined policy and strategy directives for other decisions (e.g., more profoundly consequential decisions). Control and autonomy subprocessor 1605 can implement reinforcement learning applications to evolve controllers. Accordingly, control of the electronically controlled distributed self-propelled devices can be effected in a manner that has been reinforced over time based on precedential examples, thereby avoiding undue influence of spurious phenomena on control outputs of the supervisory node. Control and autonomy subprocessor 1605 can implement swarm constrained deep learning for distributed decision making. The swarm constrained deep learning can provide variation to the learning process, allowing exploration of a range of alternative courses of action and selection of a preferred course of action among the other suboptimal alternatives. Based on its processing, which may, for example, include simulation and analysis as described above, control and autonomy subprocessor 1605 can autonomously make decisions resulting in control outputs to control operations of the electronically controlled distributed self-propelled devices. Control and autonomy subprocessor 1605 can transmit signals corresponding to those control outputs via path 1615 to processor core 1601.

While autonomous control of the electronically controlled distributed self-propelled devices can be achieved as described above, as previously noted, fully autonomous control is not necessarily ideal in all circumstances. For circumstances where decisions made by control and autonomy subprocessor 1605 are to be guided by human defined policy and strategy directives, the human defined policy and strategy directives can deviate unless accurate and meaningful situational information can be effectively presented to the person providing the human defined policy and strategy directives. Accordingly, explainability and transparency subprocessor 1606 is provided. Information outputs of at least one of sensor fusion subprocessor 1602, object detection and analysis subprocessor 1603, reasoning and planning subprocessor 1604, and control and autonomy subprocessor 1605 can be provided, either directly or, for example, via processor core 1601, to explainability and transparency subprocessor 1606, for example, via path 1611. Explainability and transparency subprocessor 1606 can identify critical information and decision criteria from the information outputs it receives and generate a logically organized report of a decision. Explainability and transparency subprocessor 1606 can implement analysis and observation to generate natural language reports. Explainability and transparency subprocessor 1606 can implement hypothesis validation to perform autonomous research. Explainability and transparency subprocessor 1606 can utilize automated ontology discovery to characterize and classify the data presented to it. Such high level characterization and classification can help obtain a terse explanation generic to decision-making of control and autonomy subprocessor 1605. Explainability and transparency subprocessor 1606 can send its explanation to processor core 1601 via path 1616. The explanation can be provided and displayed to the source of the human defined policy and strategy directives to maximize situational awareness.

The concepts of the present disclosure have been described above with reference to specific embodiments. However, one of ordinary skill in the art will appreciate that various modifications and changes can be made without departing from the scope of the present disclosure as set forth in the claims below. In particular, the numbers and types of electronically controlled distributed self-propelled devices and the manner in which information pertaining thereto is display may vary. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A system comprising:
a plurality of electronically controlled distributed devices; and
a supervisory node comprising a communications interface, a processor coupled to the communications interface, and a display coupled to the processor, the supervisory node configured to communicate with the plurality of electronically controlled distributed devices via the communications interface, the supervisory node adapted to receive sensor information from the plurality of electronically controlled distributed devices, to receive functionality information and device status information from the plurality of electronically controlled distributed devices, to determine useful life prognostics from the functionality information using the processor, to obtain human defined policy and strategy directives, to assess the useful life prognostics and device status information based on the human defined policy and strategy directives using the processor to provide device assessments, to construct device commands for the plurality of electronically controlled distributed devices based on the device assessments using the processor, and to communicate the device commands to the plurality of electronically controlled distributed devices via the communications interface.

2. The system of claim 1, wherein the supervisory node is further configured to receive from a first electronically controlled distributed device of the electronically controlled distributed devices a streaming camera feed and to display the streaming camera feed for viewing.

3. The system of claim 2, wherein the supervisory node is further configured to perform machine vision analysis of the streaming camera feed and to construct the device commands based on the streaming camera feed and the device assessments.

4. The system of claim 2, wherein the supervisory node is further configured to compare the streaming camera feed to stored camera images and to provide a battle damage assessment based on the comparison.

5. The system of claim 2, wherein supervisory node is further configured to display the streaming camera feed via a synthetic display including a virtual reality display, an augmented reality display, or both.

6. The system of claim 1, wherein the supervisory node is further configured to autonomously construct and communicate a first device command of the device commands and to receive explicit authorization prior to issuance of a second device command of the device commands.

7. The system of claim 1, wherein the supervisory node is further configured to perform outcome simulations based on historical data obtained from a data repository and to construct device commands for the plurality of electronically controlled distributed devices based on the device assessments and the outcome simulations.

8. A method comprising:
communicating, by a supervisory node, with a plurality of electronically controlled distributed devices;

receiving, at the supervisory node, sensor information from the plurality of electronically controlled distributed devices;

receiving, at the supervisory node, functionality information and device status information from the plurality of electronically controlled distributed devices;

determining, at the supervisory node, useful life prognostics from the functionality information;

obtaining, at the supervisory node, human defined policy and strategy directives;

assessing, at the supervisory node, the useful life prognostics and device status information based on the human defined policy and strategy directives to provide device assessments;

constructing, at the supervisory node, device commands for the plurality of electronically controlled distributed devices based on the device assessments; and communicating, from the supervisory node, the device commands to the plurality of electronically controlled distributed devices.

9. The method of claim 8, further comprising:

receiving, at the supervisory node from a first electronically controlled distributed device of the electronically controlled distributed devices, a streaming camera feed and displaying the streaming camera feed for viewing.

10. The method of claim 9, further comprising:

performing, at the supervisory node, machine vision analysis of the streaming camera feed, wherein the device commands are constructed based on the streaming camera feed and the device assessments.

11. The method of claim 9, further comprising:

comparing, at the supervisory node, the streaming camera feed to stored camera images and providing a battle damage assessment based on the comparison.

12. The method of claim 9, further comprising:

displaying, at the supervisory node, the streaming camera feed via a synthetic display including a virtual reality display, an augmented reality display, or both.

13. The method of claim 8, further comprising:

autonomously constructing at and communicating from the supervisory node a first device command of the device commands; and receiving, at the supervisory node, explicit authorization prior to issuance of a second device command of the device commands.

14. The method of claim 8, further comprising:

performing, at the supervisory node, outcome simulations based on historical data obtained from a data repository and constructing the device commands for the plurality of electronically controlled distributed devices based on the device assessments and the outcome simulations.

15. A system comprising:

a plurality of electronically controlled distributed devices; and a supervisory node comprising a communications interface, a human command input interface, a processor coupled to the communications interface and to the human command input interface, and a display coupled to the processor, the supervisory node configured to communicate with the plurality of electronically controlled distributed devices via the communications interface, the supervisory node adapted to receive sensor information from the plurality of electronically controlled distributed devices, to receive functionality information and device status information from the plurality of electronically controlled distributed devices, to determine useful life prognostics from the functionality information using the processor, to obtain human defined policy and strategy directives via the human command input interface, to assess the useful life prognostics and device status information based on the human defined policy and strategy directives using the processor to provide device assessments, to construct device commands for the plurality of electronically controlled distributed devices based on the device assessments using the processor, and to communicate the device commands to the plurality of electronically controlled distributed devices via the communications interface, the processor configured to arbitrate between automated control instructions generated by the processor and human-generated control instructions received via the human command input interface and to construct the device commands based on the device assessments and arbitrated control instructions obtained by arbitrating.

16. The system of claim 15, wherein the supervisory node is further configured to receive from a first electronically controlled distributed device of the electronically controlled distributed devices a streaming camera feed and to display the streaming camera feed for viewing.

17. The system of claim 16, wherein the supervisory node is further configured to perform machine vision analysis of the streaming camera feed and to construct the device commands based on the streaming camera feed and the device assessments.

18. The system of claim 16, wherein supervisory node is further configured to display the streaming camera feed via a synthetic display including a virtual reality display, an augmented reality display, or both.

19. The system of claim 15, wherein the supervisory node is further configured to autonomously construct and communicate a first device command of the device commands and to receive explicit authorization prior to issuance of a second device command of the device commands.

20. The system of claim 15, wherein the supervisory node is further configured to perform outcome simulations based on historical data obtained from a data repository and to construct device commands for the plurality of electronically controlled distributed devices based on the device assessments and the outcome simulations.

* * * * *